United States Patent [19]
Aoki

[11] Patent Number: 5,718,417
[45] Date of Patent: Feb. 17, 1998

[54] VIBRO-ISOLATING SUPPORT

[75] Inventor: Kazushige Aoki, Yokosuka, Japan

[73] Assignee: Nissan Motor Co., Ltd., Kanagawa-Ken, Japan

[21] Appl. No.: 600,573

[22] Filed: Feb. 13, 1996

[30] Foreign Application Priority Data

Feb. 24, 1995 [JP] Japan ................... 7-037102

[51] Int. Cl.⁶ ................................................ F16M 1/00
[52] U.S. Cl. ........................... 267/140.14; 267/140.15
[58] Field of Search .................. 267/140.13–140.15, 267/141.1–141.7, 219; 248/562, 636, 638; 180/300, 312

[56] References Cited

U.S. PATENT DOCUMENTS

| | | | |
|---|---|---|---|
| 4,767,106 | 8/1988 | Le Fol | 267/140.13 |
| 5,366,211 | 11/1994 | Hamada et al. | 267/140.14 |
| 5,407,169 | 4/1995 | Tournier | 267/140.14 |

FOREIGN PATENT DOCUMENTS

| | | | |
|---|---|---|---|
| 5215176 | 8/1993 | Japan | 267/140.13 |
| 6-30544 | 2/1994 | Japan . | |

Primary Examiner—Robert J. Oberleitner
Assistant Examiner—Chris Schwartz
Attorney, Agent, or Firm—Lowe, Price, LeBlanc & Becker

[57] ABSTRACT

A vibro-isolating support includes an inner tubular member having a top portion, from which a conical wall extends downwardly and inwardly. An elastic support material is bonded to the inner surface of conical wall. The bottom portion of the conical wall curves radially outwardly so that the inner tubular member has a radially outwardly opening V-shape in an axial cross section, and includes a neck between the top and bottom portions. A main fluid chamber is located inside the inner tubular member, outside of which are located an orifice and an auxiliary fluid chamber. An actuator displaces a movable member and varies the volume of the main fluid chamber.

22 Claims, 17 Drawing Sheets

VIBRO-ISOLATING SUPPORT

FIELD AND BACKGROUND OF THE INVENTION

The present invention relates to an apparatus for supporting a vibrating body such as the engine of a vehicle on a supporting body such as the vehicle body while isolating vibration. In particular, the invention relates to a vibro-isolating support which attains vibro-isolating effect by utilizing the damping force produced when fluid passes through an orifice, and which can produce active bearing power by positively changing the volume of the fluid chamber defined by an elastic support material. The invention enables both the apparatus size to be small and the apparatus output to be high.

In general, an engine mount, which is a vibro-isolating support for the power unit of a vehicle, needs to well isolate mainly idle vibration, internal sound vibration, noise vibration during acceleration, etc. Idle vibration has a frequency in the order of 20–30 Hz and a relatively large amplitude. The characteristics which the vibro-isolating support should have in order to damp idle vibration are a high dynamic spring constant and high damping. Internal sound vibration and noise vibration during acceleration each have a frequency in the order of 80–800 Hz and a relatively small or middle amplitude. The characteristics which the vibro-isolating support should have in order to damp such internal sound vibration and noise vibration are a low dynamic spring constant and low damping. Therefore, it is difficult for an engine mount consisting of ordinary elastic material alone or an engine mount of the conventional type charged with liquid to isolate all vibrations.

For example, Japanese Utility Model Registration Laid-open No. 6-30544 discloses a conventionally existing vibro-isolating support of the type charged with liquid, which can produce active bearing power (supporting force). In this vibro-isolating support, the connectors fixed on the vibrating body and supporting body sides, respectively, are interconnected through an elastic support material. The elastic support material, a vibrating plate, etc. define a main fluid chamber. The vibrating plate is elastically supported by a flat spring, and can be displaced by an electromagnetic actuator, which includes an electromagnetic coil and a permanent magnet. If the vibrating plate is vibrated by the electromagnetic force produced by the electromagnetic actuator, the main fluid chamber varies its volume. The volume variation acts on the spring in the expanding direction of the elastic support material so as to produce active bearing power. By properly vibrating the vibrating plate in accordance with the vibration generated on the vibrating body side, it is possible to damp the vibration transmitted to the supporting body side. The main fluid chamber communicates through an orifice with an auxiliary fluid chamber. If the vibration inputted from the vibrating body side expands or contracts the elastic support material, so that the main fluid chamber varies its volume, the fluid passes through the orifice, thereby to produce damping force. Consequently, it is also possible to attain the passive function of a vibro-isolating support of the type charged with fluid.

In this existing vibro-isolating support, a stopper of elastic material such as rubber is provided in the space between the vibrating plate and electromagnetic actuator. The space may be adjusted so as to be very small. Even if the space is very small in order to increase the output efficiency, it is possible to displace the vibrating plate while the stopper prevents the vibrating plate and electromagnetic actuator from colliding.

In this vibro-isolating support, the vibrating plate is elastically supported by the annular flat spring, which is so narrow that its rigidity is liable to be high. In order to sufficiently displace the vibrating plate by means of the electromagnetic actuator, there is a need of measures to thin the flat spring so that its rigidity is lower, or to adopt a larger electromagnetic actuator for higher output.

If the former measure is taken, however, the durability of the flat spring will be remarkably low. As a result, it is difficult to maintain the neutral position of the vibrating plate at an optimum initial position, so that the performance may early be lowered.

In general, the latter measure is therefore taken. If the electromagnetic actuator is larger, there is a need to use a larger permanent magnet, which is expensive and has a high energy density characteristic. This results in higher costs, heavier weight, and larger size of the whole apparatus. Therefore, it is not possible to take this measure for some vehicles with greatly restricted mounting spaces.

Even if it is possible to lower the rigidity of the flat spring, which supports the vibrating plate, without lowering its durability, the above problems remain still pending in a vibro-isolating support such as an engine mount particularly for a diesel vehicle. Such an engine mount needs to attain excellent vibro-isolating effect by sufficiently diminishing the idle vibration of large amplitude generated during low engine speed while the vehicle stops. The reason why the problems remain pending is that there is a need to enlarge the actuator, which produces bearing power, in order to increase the force itself inputted into the main fluid chamber.

In order for the rubbery stopper of the vibro-isolating support shown in the publication to function as a shock eliminator or cushioning material, there is a need of certain volume. In this vibro-isolating support, however, the space for the stopper between the vibrating plate and actuator is very small for higher output efficiency. Practically, it is therefore necessary to cut or otherwise work part of the vibrating plate or actuator in order to form a space in which to fit the stopper. Because the cutting removes part of the magnetic circuit, there is a need to make the actuator larger for sufficient output. Again, this results in higher costs, heavier weight and larger size of the whole apparatus. Consequently, it becomes more and more difficult to apply the mount to a vehicle with a largely restricted mounting space.

In order for a vibro-isolating support of the type charged with liquid and utilizing liquid resonance to generate large liquid resonance effective in damping vibration, there is a need to provide an auxiliary fluid chamber and an orifice both of large volume, which, however, results directly in the apparatus being large. For this reason, it is difficult to apply to a vehicle or the like with a very restricted mounting space a vibro-isolating support of the type charged with liquid which can produce large damping force.

SUMMARY OF THE INVENTION

In view of the above problems which should be solved in the prior art, it is the object of the present invention to provide a vibro-isolating support of the type charged with liquid which is small-sized and can generate control vibration of large amplitude for diminishing vibration of large amplitude.

One invention, for achieving the above object, is a vibro-isolating support comprising an elastic support material interposed between the vibrating body side and the supporting body side; an elastically supported movable member; a main fluid chamber defined between said elastic support material and said movable member; an auxiliary fluid chamber of variable volume; an orifice interconnecting said chambers; fluid in said chambers and said orifice; and, an actuator for displacing said movable member in the direction in which said main fluid chamber varies its volume, and characterized by a tubular member coupling one of said vibrating body and supporting body sides and said elastic support material together, said tubular member having an axis in the direction in which the vibrating body is supported, said tubular member having a neck formed at a position in the axial direction, said main fluid chamber being located inside said tubular member, and said auxiliary fluid chamber and said orifice being located outside said tubular member.

In accordance with this invention, because the tubular member is interposed between one of the vibrating body and supporting body sides and the elastic support material, the vibration on the vibrating body side is transmitted to the supporting body side through the elastic support material and tubular member, which are in series. When the vibration elastically deforms the elastic support material, the main fluid chamber defined by the elastic support material expands or contracts in volume, so that the fluid moves through the orifice between the main and auxiliary fluid chambers. In addition, the neck formed in the tubular member makes a sufficient space around the tubular member. Therefore, even if the auxiliary fluid chamber and orifice of relatively large volume are arranged outside the tubular member, it is avoided that they beetle outside largely.

Another feature of the invention is a vibro-isolating support according to the above invention, wherein at least part of the tubular member is shaped in axial cross section like a V opening outward (precisely, like a sign of inequality ">" or "<" which is a V tipped over).

Another feature of the invention is a vibro-isolating support according to the above first invention, wherein the shape in axial cross section of at least part of the tubular member is cranked and opens outward.

By adopting the shape of the tubular member in accordance with the above two inventions, the tubular member can be formed easily with a neck. In these inventions, the shape in axial cross section of at least part of the tubular member may be substantially like a V or cranked. The corner/s of the V shape or the cranked shape may be rounded so that the shape resembles a U.

Another feature of the invention is a vibro-isolating support according to the above first invention, wherein the elastic support material is bonded to the inner surface of the tubular member nearer than the neck to the other of the vibrating body and supporting body sides.

In accordance with this invention, the joint between the elastic support material and tubular member is on the inner surface of the tubular member nearer than the neck to the other of the vibrating body and supporting body sides (whichever side the tubular member is not joined to). Therefore, even if the tubular member having the neck is interposed, the elastic support material can have sufficient volume for low rigidity.

Another feature of the invention is a vibro-isolating support according to the above first invention, wherein the main fluid chamber is circular in cross section, coaxial with the tubular member, and smaller in diameter than the neck.

In accordance with this invention, it is possible to reduce the effective pressure-receiving area on the elastic support material side, on which the main fluid chamber is defined.

This amplifies the displacement of the spring in the expanding direction of the elastic support material with respect to the volume variation of the main fluid chamber. As a result, it is possible to produce controlling force of large amplitude, which diminishes vibration of large amplitude.

Another feature of the invention is a vibro-isolating support according to the above first invention, wherein the tubular member has a radially extending flat portion formed nearer than the neck to one of the vibrating body and supporting body sides. The main fluid chamber opens at the center of the flat portion. The movable member is supported on one of the vibrating body and supporting body sides opposite to the flat portion.

Particularly, in accordance with this invention, when the actuator displaces the movable member facing the flat portion, the main fluid chamber varies its volume. The variation expands or contracts the spring in the expanding direction of the elastic support material. The main fluid chamber opens at the center of the flat portion, and the movable member is located outside the opening. As a result, the effective pressure-receiving area on the elastic support material side becomes small in comparison with that of the main fluid chamber on the movable member side. Therefore, the displacement of the movable member is amplified through the volume variation of the main fluid chamber, and then transmitted to the spring in the expanding direction of the elastic support material.

In particular, another invention is a vibro-isolating support according to the above invention, wherein the surface of the movable member which faces the main fluid chamber is a plane in parallel to the flat portion. The plane is larger in area than the opening of the main fluid chamber.

In this case, in accordance with this invention, the effective pressure-receiving area of the main fluid chamber on the movable member side is surely larger than that on the elastic support material side. In addition, the surface of the movable member which faces the main fluid chamber is a plane. Therefore, if the scale on the movable member side is equivalent, the effective pressure-receiving area is maximum. In other words, the movable member of minimum scale can realize an equivalent effective pressure-receiving area.

Another feature of the invention is a vibro-isolating support according to the above first invention, and further comprising an orifice-defining member which surrounds the outer surface of the tubular member, and a diaphragm which surrounds the outer surface of the orifice-defining member. The orifice is formed inside the orifice-defining member. The auxiliary fluid chamber is formed between the orifice-defining member and the diaphragm.

In accordance with this invention, the orifice is formed around the tubular member, and surrounded by the auxiliary fluid chamber. Therefore, the space around the tubular member is effectively utilized so as to enlarge the orifice and auxiliary fluid chamber in volume. The enlarged volume restrains the internal pressure of the main fluid chamber from extremely rising, even if high load is applied to the elastic support material. The enlarged volume also increases the mass in the fluid resonance system (formed by the fluid in the orifice as "mass" and the series-springs as a "spring" which consist of the spring in the expanding direction of the elastic support material and the supporting spring of the movable member) of the vibro-isolating support. This improves the damping characteristics of the fluid resonance system, and further decreases the actuator load for control which utilizes fluid resonance.

Another feature of the invention is a vibro-isolating support according to the above invention, wherein the orifice-defining member is formed out of an elastic tube.

In this case, in accordance with this invention, the orifice-defining member is an elastic tube, so that it is easy to form an orifice. Therefore, it is easy to adjust the resonance frequency of the fluid resonance system, and also to form orifices of different characteristics.

By contrast, another invention is a vibro-isolating support according to second above invention of, wherein the orifice-defining member is formed out of a metal tube.

In accordance with this invention, the orifice-defining member is a metal tube, Which can bear part of the load on the tubular member, thereby serving to reinforce the tubular member.

Another feature of the invention is a vibro-isolating support according to the third above invention, wherein the orifice-defining member is formed by bending as an extension from the top portion of said tubular member.

In accordance with this invention, such structure has the advantage of further reducing the production costs.

Another feature of the invention is a vibro-isolating support according to the above first invention, wherein the movable member includes a pressure plate partially defining the main fluid chamber, and a flat spring joined to the center of the surface of the pressure plate which faces reversely to the main fluid chamber. The periphery of the flat spring is fixed to one of the vibrating body and supporting body sides.

In accordance with this invention, when the force produced by the actuator is transmitted to the pressure plate, the pressure plate is displaced with elastic deformation of the flat spring. This varies the volume of the main fluid chamber. Because the flat spring interconnects the center of the pressure plate and one of the vibrating body and supporting body sides, the portion for elastic deformation of the flat spring is relatively wide. Therefore, even if the flat spring is thickened for higher durability, the pressure plate can be largely displaced by relatively small force.

Another feature of the invention is a vibro-isolating support according to the above invention, wherein at least the surface of the pressure plate which faces the main fluid chamber is covered by an elastic film. The periphery of the elastic film is laid on the periphery of the flat spring, and fixed to one of the vibrating body and supporting body sides.

In accordance with this invention, the periphery of the elastic film is laid on the periphery of the flat spring, and fixed to one of the vibrating body and supporting body sides. Therefore, the elastic film functions as a seal, which prevents the fluid in the main fluid chamber from leaking to the flat spring side of the pressure plate.

Another feature of the invention is a vibro-isolating support according to the above invention, wherein the pressure plate is wholly covered with an elastic film by curing adhesion.

In this case, in accordance with this invention, the whole pressure plate is covered with an elastic film, so that it is avoided that the pressure plate and flat spring directly impinge, in addition to the operation or function of the above invention.

Another feature of the invention is a vibro-isolating support according to the third above invention, and further comprising an elastic stopper interposed between the flat spring and the periphery of the surface of the pressure plate which faces the flat spring.

In accordance with this invention, the periphery of the flat spring fixed on the vibrating body or supporting body side does not follow the displacement of the pressure plate. As a result, the space between the flat spring and the periphery of the surface of the pressure plate which faces the flat spring expands or contracts dependently on the pressure plate displacement. Therefore, when the pressure plate is largely displaced toward the flat spring, the stopper interposed in the space deforms elastically so as to be collapsed. This enables the pressure plate to be displaced toward the flat spring as largely as the stopper can elastically deform. In addition, because the stopper is located at the periphery of the pressure plate, it early functions against the pressure plate inclination.

In addition, the distance between the pressure plate periphery and the flat spring bears no relation to the actuator output efficiency, and can therefore be wide. The wider the space is, the thicker the stopper can be, and the softer the elastic material for the stopper can be. If the stopper is soft, it can be collapsed to be thin by small force, so that the same output of the actuator can largely displace the pressure plate.

Further, there is no need to cut any important portion of the movable member or the actuator in order to fit the stopper.

The invention of claim 15 is a vibro-isolating support according to the invention of claim 14, wherein the stopper is an annular part fixed to the pressure plate.

In accordance with this invention, the stopper is fixed to the pressure plate. Therefore, stopper dislocation etc. can hardly occur, and it is possible to surely attain the operation of the above invention. In addition, the trouble or labor for assembly can be less. In particular, if the whole pressure plate is covered by an elastic film, as in the second above invention, a stopper can be formed only by thickening part of the elastic film.

By contrast, another invention is a vibro-isolating support according to the second above invention, wherein the stopper is an annular elastic film. The periphery of this annular elastic film is laid on the periphery of the flat spring, and fixed to one of the vibrating body and supporting body sides.

In accordance with this invention, the stopper is one or more independent annular elastic films. Therefore, it is possible to adjust the stopper characteristics by properly adjusting, for example, the thickness or number of the elastic films.

On the other hand, another feature of the invention is a vibro-isolating support according to the first invention, wherein the actuator is an electromagnetic actuator for generating electromagnetic force. A magnetic path member, which can be magnetized, is fitted on a portion of the movable member which faces the electromagnetic actuator.

The distance between the magnetic path member fixed to a specified portion of the movable member and the electromagnetic actuator is important in deciding the electromagnetic actuator output efficiency. In accordance with this invention, the magnetic path member is separately provided. This separates the function forming a magnetic circuit and the pressure-receiving function, which receives the internal pressure of the main fluid chamber, of the movable member. It is thus possible to separately design and realize the desired functions. Particularly, in combination with any one of the above five inventions, the separation easily realizes the desired characteristics, because the pressure plate for the pressure-receiving function, the flat spring for the elastically supporting function, and the magnetic path member for the magnetic circuit function are independent from one another.

In general, the electromagnetic actuator cannot be located on the main fluid chamber side of the pressure plate because of sealing etc., and it is therefore located on the other side. Located in that position is the flat spring. It is therefore difficult to make very small the space between the pressure plate and electromagnetic actuator. If the pressure plate forms a magnetic circuit, the electromagnetic actuator output efficiency is not improved. In accordance with this invention, however, the electromagnetic actuator output efficiency easily becomes high, because the magnetic path member functions as part of the magnetic circuit.

Another feature of the invention is a vibro-isolating support according to the above invention, wherein the electromagnetic actuator includes a yoke, which supports the end of the tubular member on one of the vibrating body and supporting body sides. The yoke is fixed to one of the vibrating body and supporting body sides.

In accordance with this invention, the tubular member is fixed to one of the vibrating body and supporting body sides through the electromagnetic actuator yoke. This omits members such as the case for the electromagnetic actuator.

Another feature of the invention is a vibro-isolating support according to the first invention, and further comprising an outer tube of metal, which surrounds the tubular member and extends between both ends of the tubular member. The tubular member and the outer tube define a space therebetween, in which the auxiliary fluid chamber and the orifice are formed.

In accordance with this invention, part of the load applied between both ends of the tubular member is applied to the outer tube. This reduces the load on the tubular member. In addition, the outer tube surrounds the members defining the auxiliary fluid chamber and the orifice. As a result, for example, the diaphragm etc. defining the auxiliary fluid chamber are protected.

Another feature of the invention is a vibro-isolating support according to the first invention, wherein a fluid resonance system is formed by the fluid in the orifice as mass and the spring in the expanding direction of the elastic support material and the spring supporting the movable member as a spring. The frequency for maximum damping in the liquid resonance system is substantially equal to the frequency of the vibration generated on the vibrating body side.

In accordance with this invention, while vibration is inputted which has a frequency substantially equal to the frequency for maximum damping of the fluid resonance system in the vibro-isolating support (hereinafter referred to as the frequency for the maximum damping), the controlling force needed by the actuator to diminish the vibration is small. Therefore, if the actuator output is the same, it is possible to more largely excite the spring in the expanding direction of the elastic support material. The reason is that the passive force produced by fluid resonance during control is added to the force produced by the actuator, so that the force which the actuator needs to produce is reduced accordingly.

Another feature of the invention is a vibro-isolating support according to the above invention, and applied to a vehicle, wherein the vibrating body is an engine. The frequency for maximum damping in the fluid resonance system is substantially equal to the idle vibration frequency of the vehicle.

Therefore, in accordance with this invention, the frequency for the maximum damping substantially equals the idle vibration frequency. As a result, while the idle vibration is inputted, controlling force of accordingly large amplitude is produced. Because the idle vibration in a vehicle is large in amplitude (remarkably in diesel vehicles etc.), the ability to produce controlling force of the largest amplitude of the vibro-isolating support is utilized in the condition where the input vibration is the largest in amplitude.

BRIEF EXPLANATION OF THE DRAWINGS

Preferred embodiments of the present invention are shown below with reference to the accompanying drawings, wherein.

DETAILED DESCRIPTION OF THE PREFERRED EMBODIMENTS

Figure 1:
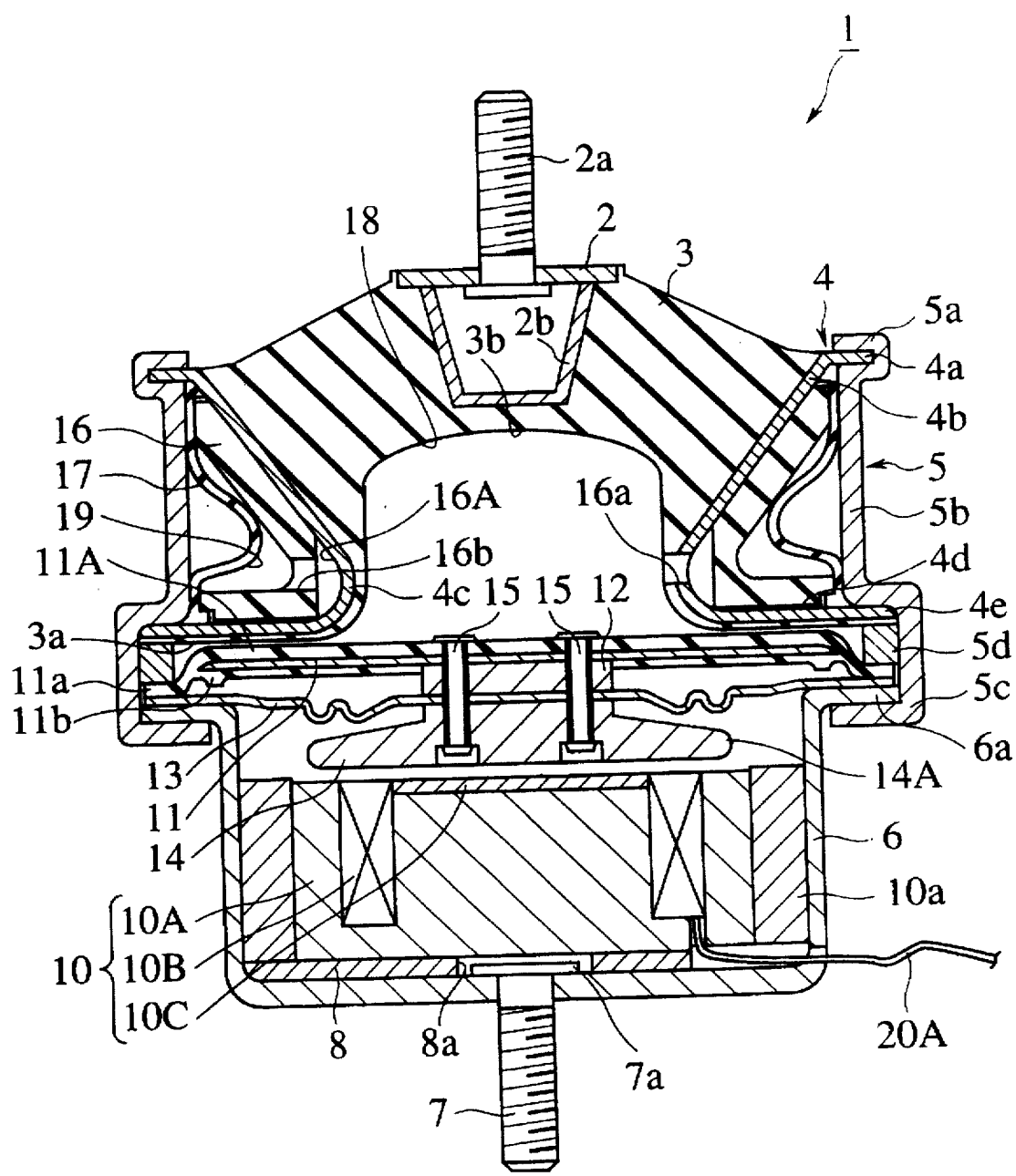
FIG. 1 is a side view in axial cross section of an engine mount according to the first embodiment.
Figure 2:
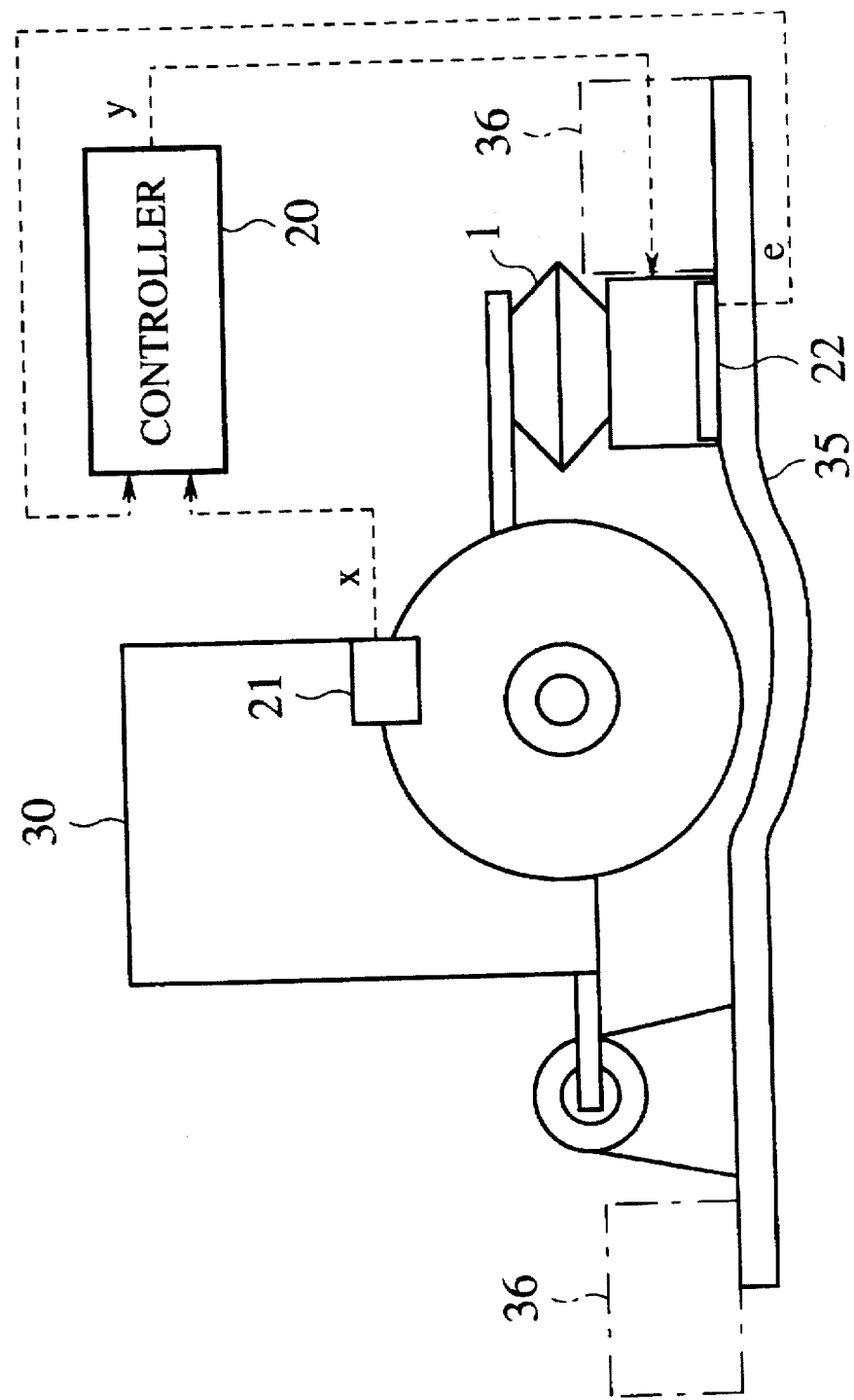
FIG. 2 is a diagram of a vehicle, which shows arrangement of the engine mount.

FIG. 1 shows a so-called active engine mount as a vibro-isolating support according to the first embodiment. An active, engine mount actively damps the vibration transmitted from the engine on a vehicle to the vehicle body. FIG. 2 shows the overall construction in which the engine mount 1 is practically mounted.

With reference to FIGS. 1 and 2, the engine mount 1 is circular in plan view and has a vertical axis. The engine mount 1 is adapted to vertically support a vibrating body. The engine mount 1 includes a connector 2 having a bolt 2a fixed to its top for mounting on an engine 30 as a vibrator. The connector 2 also has a hollow conical portion 2b at its bottom in the form of a reversed trapezoid in axial cross section. The conical portion 2b has a vertical axis. An elastic support material 3 is bonded by curing or vulcanization to the underside of connector 2, and covers the periphery and bottom of conical portion 2b.

The elastic support material 3 is thick and generally circular, gently sloping downward from the center to the periphery. The outer periphery of elastic support material 3 is bonded by curing to the inner periphery of an inner tube 4 as a tubular member which is coaxial with the conical portion 2b.

Specifically, the inner tube 4 has a radial top flange 4a and a conical wall 4b, which extends downward and inward from the radially inner edge of flange 4a. The elastic support material 3 is bonded to the inner periphery of conical wall 4b. The bottom of conical wall 4b curves radially outward, forming a neck 4c. The inner tube 4 further has a flat portion 4d extending horizontally or radially from the bottom of neck 4c. The flat portion 4d includes a peripheral portion 4e. In axial cross section, the inner tube 4 is shaped like a pair of Vs tipped over and opening radially outward. The elastic support material 3 continues to an elastic film 3a covering the undersides of flat portion 4d and peripheral portion 4e.

The elastic support material 3 defines a cylindrical cavity 3b inside it, which is coaxial with the inner tube 4. The cylindrical cavity 3b is smaller in diameter than the neck 4c of inner tube 4, and has an open bottom at the flat portion 4d.

The upper, outer and lower surfaces of top flange 4a of inner tube 4 are gripped by the top portion 5a of an outer tube 5, which is coaxial with the inner tube 4. The outer tube 5 has a cylindrical wall 5b extending vertically downward from the top portion. The cylindrical wall 5b surrounds the periphery of inner tube 4 with a space between them. The bottom portion 5c of outer tube 5 surrounds and grips the peripheral portion 4e of inner tube 4, the top flange 6a of an actuator case 6, and the peripheries of the members, which are mentioned later, stacked between them. The bottom portion 5c is caulked with these parts.

The actuator case 6 is cylindrical with an open top, and coaxial with the inner tube 4. Downward from the bottom of actuator case 6 protrudes a bolt 7 for mounting on a support member 35, which is fixed to the vehicle body 36. The head 7a of bolt 7 is located in the center space 8a of a ring 8, which is fitted on the inner bottom surface of actuator case 6.

The actuator case 6 contains an electromagnetic actuator 10 which is coaxial with it. The electromagnetic actuator 10 includes a cylindrical yoke 10A fitted on the ring 8, an exciting coil 10B wound in the yoke 10A adjacently to its top and coaxially with it, and a permanent magnet 10C fixed to the top of yoke 10A inside the exciting coil 10B. The poles of permanent magnet 10C are directed vertically. The electromagnetic actuator 10 is fixed by an adapter 10a interposed between the inner periphery of actuator case 6 and the outer periphery of yoke 10A.

Fitted below the inner tube 4 is a pressure plate 11 of a thin metal disk in parallel with its flat portion 4d. Specifically, a lower central surface of pressure plate 11 contacts with a spacer 12, the bottom of which contacts with a central portion of a circular flat spring 13. A lower central surface of flat spring 13 contacts with the top of a magnetic path member 14, which may be made of iron or other magnetizable metal. These parts 11, 12, 13 and 14 are fastened together by rivets 15 extending vertically through them. In this embodiment, the parts 11–14 form a movable member.

The pressure plate 11 is covered wholly with an elastic film 11A by curing adhesion. The elastic film 11A is larger in diameter than the pressure plate 11, and has a peripheral portion 11a expanded outside the pressure plate 11. The peripheral portion 11a is laid on the peripheral portion of flat spring 13. These peripheral portions are fastened together with an annular spacer 5d between the peripheral portion 4e of inner tube 4 and the flange 6a of actuator case 6.

The magnetic path member 14 includes a bottom disk portion 14A, which substantially covers the top of electromagnetic actuator yoke 10A. The radial bottom surface of disk portion 14A faces the top of yoke 10A with a slight space between them.

The elastic film 11A has an annular stopper 11b formed on its lower surface by thickening it at the periphery of pressure plate 11.

The thickness and rigidity of stopper 11b should be such as to prevent the magnetic path member 14 and electromagnetic actuator 10 from colliding with each other. Because the peripheral portion of flat spring 13 is fixed to the actuator case 6, the space between this peripheral portion and pressure plate 11 expands or contracts as the pressure plate 11 is displaced vertically. When the pressure plate 11 is displaced downward and the space between it and the flat spring 13 becomes narrow, the stopper 11b elastically deforms for contraction. When it has been impossible for the stopper 11b to elastically deform, the stopper functions. Accordingly, the thickness and rigidity of stopper 11b may be so selected that a space remains between the magnetic path member 14 and electromagnetic actuator 10 when the stopper 11b has collapsed to a minimum.

The inner tube 4 and outer tube 5 define an annular space between them, in which an orifice-defining member 16 is fitted, and a diaphragm 17 surrounds the periphery of orifice-defining member 16.

The orifice-defining member 16 is a rubbery tube of elastic material adhering to the outer surface of conical wall 4b of inner tube 4. The shape of orifice-defining member 16 is similar to that of inner tube 4, but an annular space or orifice 16A is formed between the neck of rubbery tube 16 and the neck 4c.

The diaphragm 17 is a rubbery tube of elastic film. The top and bottom of diaphragm 17 are gripped or pinched between the inner surface of outer tube 5 and the outer surface of orifice-defining member 16 all along their circumferences. The axially intermediate portion of diaphragm 17 is somewhat slack or loose, so that it can easily expand or contract.

The cylindrical cavity 3b in the elastic support material 3 and the pressure plate 11 define a main fluid chamber 18. The orifice-defining member 16 and diaphragm 17 define an auxiliary fluid chamber 19 between them. The main fluid chamber 18 communicates with the orifice 16A through a passage 16a, which is formed in the neck 4c of inner tube 4 and the elastic support member 3. The orifice 16A communicates with the auxiliary fluid chamber 19 through a passage 16b, which is formed in the orifice-defining member 16. The passage 16b is positioned circumferentially away from the passage 16a by about 180°. The main fluid chamber 18, orifice 16A and auxiliary fluid chamber 19 are charged with oil or other fluid.

Figure 3:
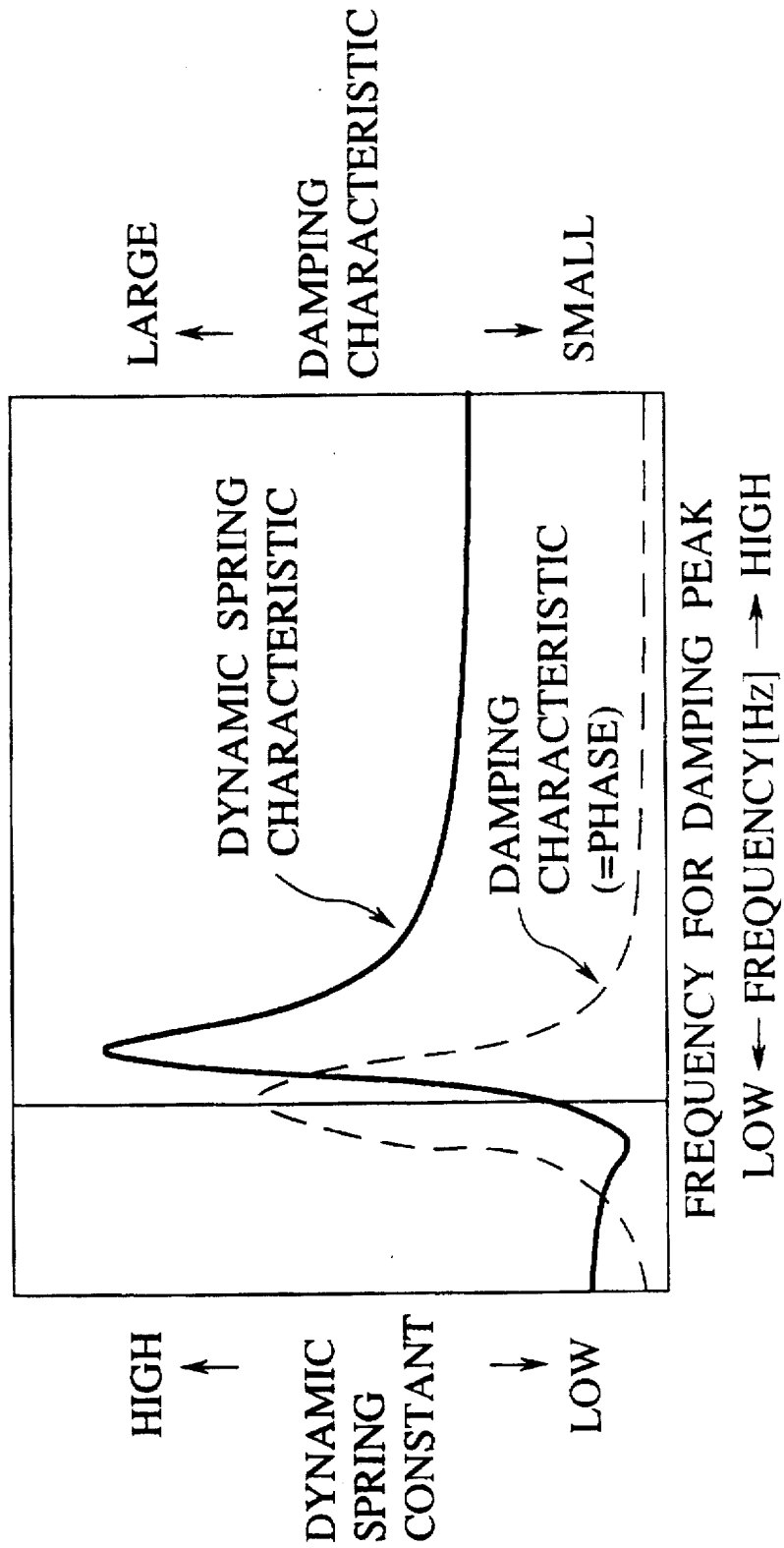
FIG. 3 is a graph of frequency characteristics, which shows the dynamic spring characteristic and the damping characteristic.

The mass of the fluid in the orifice 16A, and the characteristics of the fluid resonance system formed by the spring in the expanding direction of elastic support material 3 and the flat spring 13 are so adjusted, as shown in FIG. 3, that the frequency for damping peak (maximum damping) equals the frequency of the idle vibration generated while the vehicle stops.

The exciting coil 10B of electromagnetic actuator 10 is connected through a harness 20A to a controller 20. As shown by the block diagram of FIG. 2, the exciting coil 10B can generate specified electromagnetic force in accordance with the drive signal y as the driving current supplied from the controller 20.

The controller 20 includes a microcomputer, an interface circuit if needed, an A/D converter, a D/A converter, an amplifier, etc. If a vibration at the idle vibration frequency or a higher frequency (for example, internal sound vibration) is inputted, the controller 20 generates and supplies to the exciting coil 10B a drive signal y, which causes a control vibration having the same period (cycle) as that vibration in the engine mount 1 so that the force of transmission of the vibration to the support member 35 is "0" (more specifically, so that the exciting force inputted into the engine mount 1 by the vibration on the engine 30 side is offset by the controlling force obtained by the electromagnetic force of electromagnetic actuator 10).

In connection with, for example, a reciprocating 4-cylinder engine, idle vibration and internal sound vibration, are caused mainly by the engine vibration as the secondary component of the engine rotation being transmitted through the engine mount 1 to the support member 35. Therefore, the transmission rate of vibration can be reduced by generating and outputting a drive signal y in synchronism with the secondary component of the engine rotation. In this embodiment, a pulse signal generator 21 generates an impulse signal in synchronism with the rotation of the crankshaft of engine 30 (for example, in a reciprocating 4-cylinder engine, one impulse signal each time the crankshaft rotates by 180°) and outputs it as the reference signal x. The controller 20 is supplied with the reference signal x as the signal representing the generation of vibration in the engine 30.

Fixed to the support member 35 is an acceleration sensor 22 near the engine mount 1. The acceleration sensor 22 detects the vibration of support member 35 in the form of acceleration, and outputs it as the residual vibration signal e. The controller 20 is supplied with the residual vibration signal e as the signal representing the vibration after interference.

The controller 20 generates and outputs a drive signal y based on the reference signal x and residual vibration signal e in accordance with filtered-X LMS algorithm, which is sequentially updating adaptation algorithm. More specifically, the algorithm is synchronous filtered-X LMS algorithm.

The controller 20 has an adaptive digital filter W, of which the filter factor $W_i$ (i=0, 1, 2 ..., I–1; I is the number of taps) is variable. The controller 20 outputs the filter factors $W_i$ of adaptive digital filter W in order as the drive signal y at specified sampling clock intervals from the point of time when the latest reference signal x is inputted. When necessary, the controller 20 updates the filter factors $W_i$ of adaptive digital filter W in accordance with the reference signal x and residual vibration signal e, in order to damp the vibration transmitted from the engine 30 through the engine mount 1 to the support member 35.

In accordance with filtered-X LMS algorithm, the updating equation of adaptive digital filter W can be represented by the following equation (1):

$$W_i(n+1)=W_i(n)-\mu R^T e(n) \tag{1}$$

In this equation, the terms with "(n)" represent values at the time n. $\mu$ is a factor, which is called a convergence factor, for the speed and stability of convergence of filter factors $W_i$. $R^T$ is, theoretically, a value (reference signal or filtered-X signal) which is the reference signal x filtered by a transfer function filter $C^{\wedge}$, that is a model of the transfer function C between the force generated by the electromagnetic actuator 10 and the acceleration sensor 22. In this embodiment, the reference signal x is a series of impulses as a result of application of synchronous filtered-X LMS algorithm. Consequently, when impulse responses of transfer function filter $C^{\wedge}$ are generated one after another in synchronism with the reference signal x, $R^T$ coincides with the sum at the time n of the impulse response wave forms.

Theoretically, the adaptive digital filter W filters the reference signal x to generate a drive signal y. The filtering corresponds to a convolution operation of digital operations. Because the reference signal x is a series of impulses, however, the outputting of the filter factors $W_i$ of adaptive digital filter W in order as the drive signal y at specified sampling clock intervals from the point of time when the latest reference signal x is inputted, as mentioned above, results the same as the case where the filtering result is the drive signal y.

Figure 4:
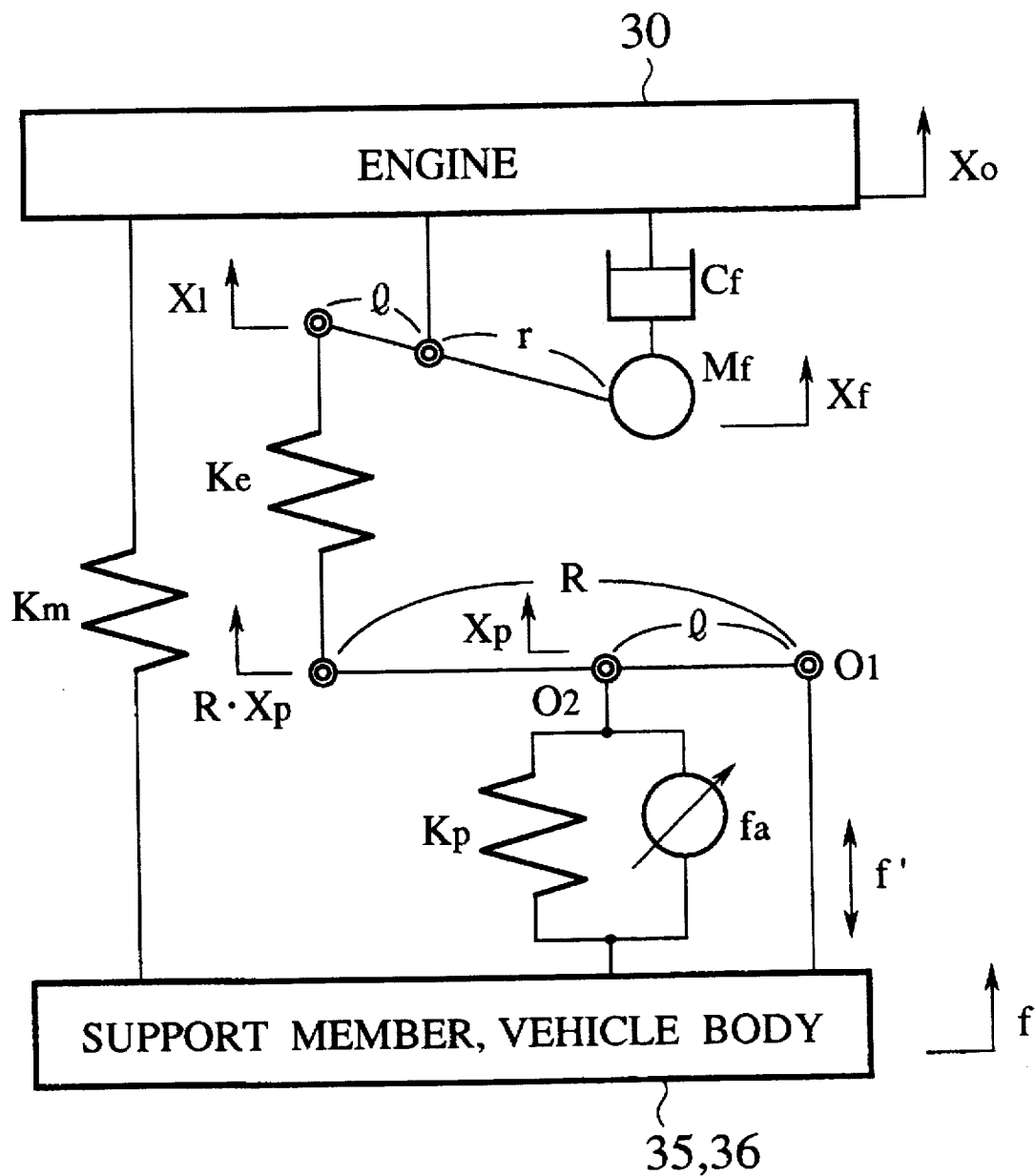
FIG. 4 is a diagram of the vehicle, which shows a model of the engine mount according to this embodiment.

A model of engine mount 1 is shown in FIG. 4, wherein:

$M_f$ is the mass [Kg] of the fluid in the orifice 16A;

$C_f$ is the viscous damping coefficient [Ns/m] of the fluid in the orifice 16A;

$K_m$ is the spring constant [N/m] of elastic support material 3 in the supporting direction;

$K_e$ is the spring constant [N/m] of elastic support material 3 in the expanding direction;

$K_p$ is the spring constant [N/m] of flat spring 13;

$f_a$ is the controlling force [N] exerted by the electromagnetic actuator 10 on the magnetic path member 14;

$x_0$ is the displacement [m] inputted from the engine 30 side into the engine mount 1;

$x_f$ is the displacement [m] of the fluid in the orifice 16A;

$x_1$ is the displacement [m] of the upper portion of the spring in the expanding direction of elastic support material 3;

$x_p$ is the displacement [m] of magnetic path member 14;

f' is the fulcrum reaction [N];

f is the force of transmission [N] to the support member 35 side;

R is the ratio ($A_p/A_u$) of the effective pressure-receiving area $A_p$ [m²] of pressure plate 11 to the effective pressure-receiving area $A_u$ [m²] of the spring in the expanding direction of elastic support material 3;

r is the ratio ($A_u/A_o$) of the effective pressure-receiving area $A_u$ [m²] to the pressure-receiving area $A_o$ [m²] of orifice 16A.

The equation of motion of this model can be represented by the equation (2) below. The equation of balance of the suspended log displacement can be represented by the equation (3) below. The equations of balance of the moments around the fulcrums $O_1$ and $O_2$ can be represented by the equations (4) and (5), respectively, below. The equation of transmission of the force of engine mount 1 can be represented by the equation (6) below.

$$M_f(dx_f^2/dt^2)+C_f(dx_f/dt-dx_0/dt)-(1/r)K_e(x_1-R\cdot x_p)=0 \tag{2}$$

$$l(x_f-x_0)=r(x_1-x_0) \tag{3}$$

$$R\cdot K_e(x_1-R\cdot x_p)+K_p\cdot x_p+f_a=0 \tag{4}$$

$$(R-l)K_e(x_1-R\cdot x_p)-l\cdot f'=0 \tag{5}$$

$$f=K_m\cdot x_0-f_a+K_p\cdot x_p-f' \tag{6}$$

Figure 5:
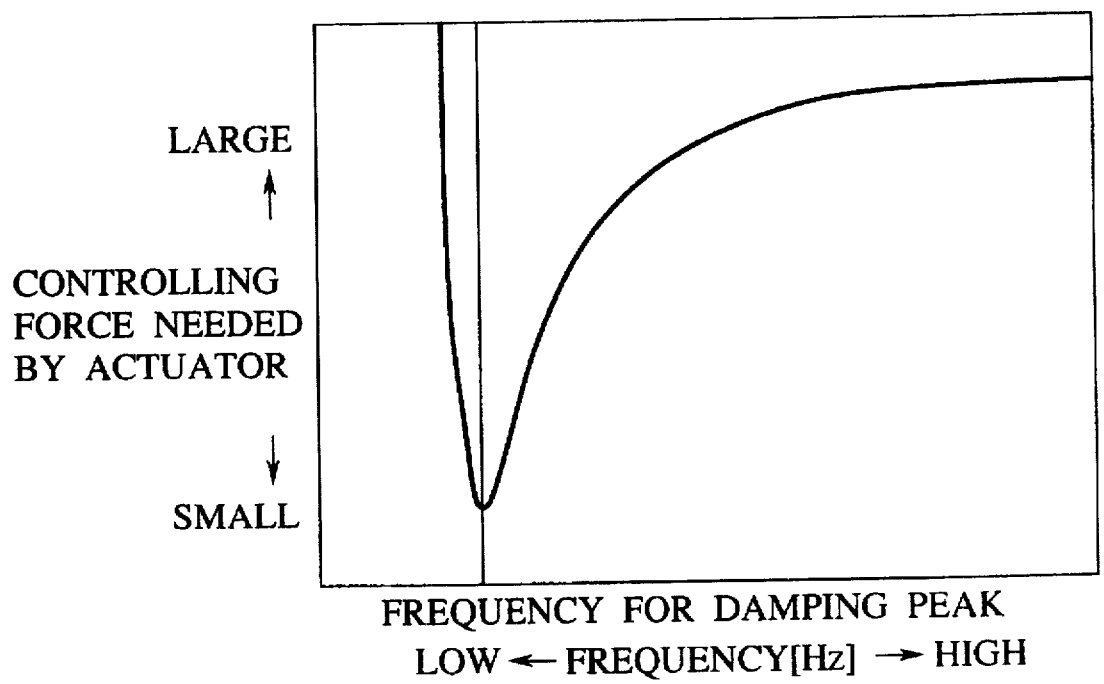
FIG. 5 is a graph showing the frequency characteristic of the necessary controlling force of the actuator.

The equation (6) represents the characteristic of engine mount 1 of the type charged with fluid, if the controlling force $f_a$ of electromagnetic actuator 10 is "0". The dynamic spring constant and the damping characteristic are as shown in FIG. 3. By contrast, the controlling force needed for the electromagnetic actuator 10 to make the force of transmission f in the equation (6) "0" has a characteristic as shown in FIG. 5. It will be seen in FIG. 5 that the controlling force is minimum at the frequency for damping peak shown in FIG. 3. The reason is that, since the force passively produced by the resonance of the fluid passing through the orifice 16A during control is added to the active controlling force produced by the electromagnetic actuator 10, it is possible to reduce the part of the force which needs producing by the electromagnetic actuator 10, if the total controlling force is the same.

The operation of this embodiment is explained below.

Figure 6:
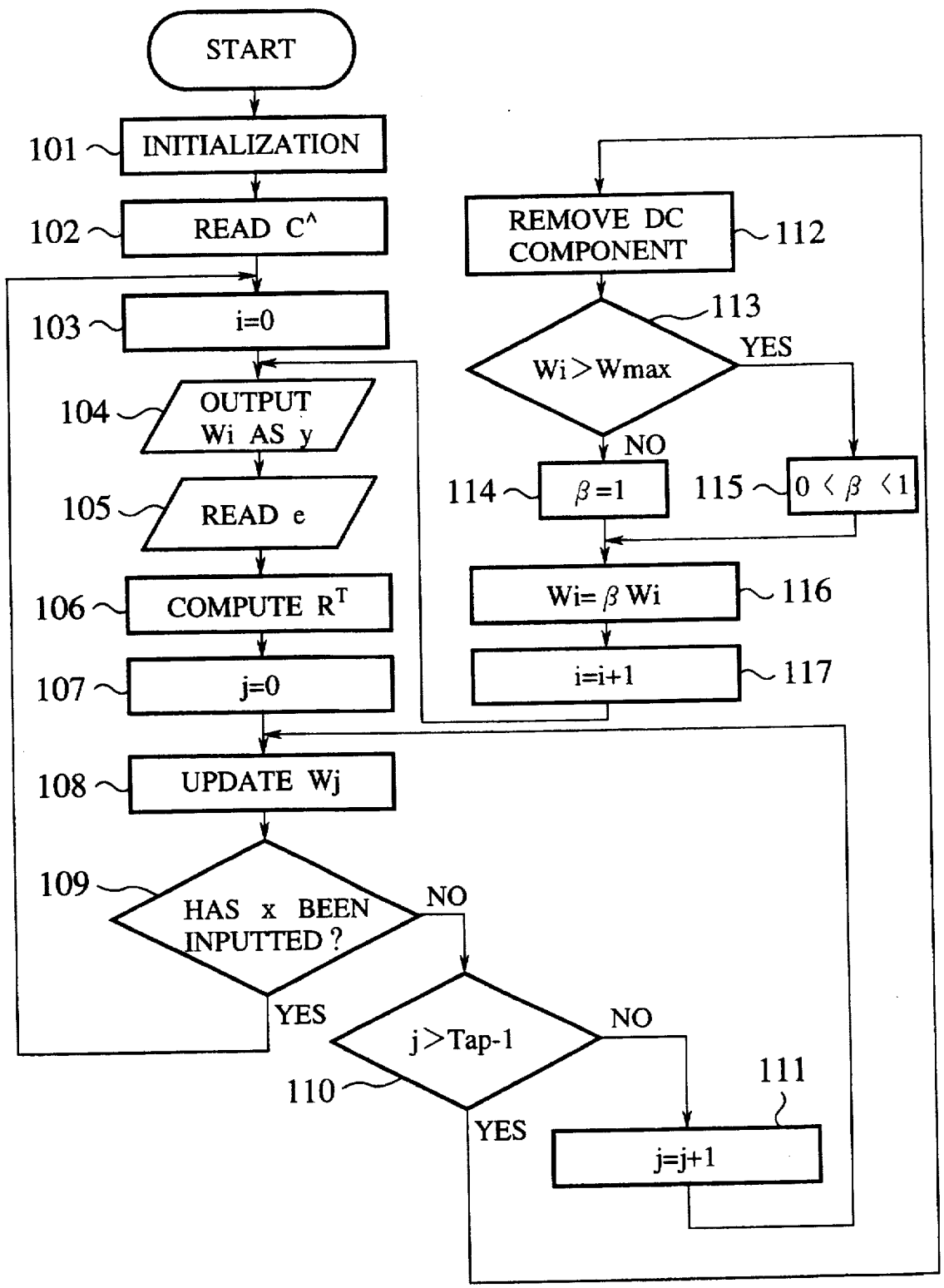
FIG. 6 is a flow chart showing the outline of the process carried out by the controller.

When the engine 30 has started and vibration is inputted into the engine mount 1, the controller 20 executes specified operations and outputs to the electromagnetic actuator 10 a drive signal y, which causes the engine mount 1 to produce an active controlling force for damping the vibration. This is specifically explained below with reference to FIG. 6, which is a flowchart schematically showing the process executed in the controller 20. As explained in detail below, the process shown in FIG. 6 is such that a process is executed for one cycle in synchronism with the reference signal x, which is a series of impulses, while a process is executed for one sampling in synchronism with the clock pulses at specified intervals which are started at the time when the reference signal x is inputted.

At the first step 101, specified initialization is carried out.

At the next step 102, the transfer function filter $\hat{C}$ stored in a specified storage region is read.

At the next step 103, the counter i (for counting the times at which the drive signal y is outputted during one cycle) is cleared for zero.

At the next step 104, the ith filter factor $W_i$ of adaptive digital filter W is outputted as the drive signal y to the exciting coil 10B of electromagnetic actuator 10.

At the next step 105, the residual vibration signal e is read.

At the next step 106, the reference signal x is filtered by the transfer function filter $\hat{C}$ to operate or compute the reference signal $R^T$ for updating. The specific operation of the reference signal $R^T$ for updating is as mentioned above.

At the next step 107, the counter j is cleared for zero. The counter j is a counter for judging whether or not a required number of the operations have been executed for updating the filter factor $W_i$ of adaptive digital filter W.

At the next step 108, the filter factor $W_j$ of adaptive digital filter W is updated in accordance with the equation (1) above.

At the next step 109 after completion of the updating at the step 108, it is judged whether or not the next reference signal x has been inputted. If not, the process goes to the step 110 for updating the next filter factor of adaptive digital filter W, or outputting a drive signal y.

At the step 110, it is Judged whether or not the counter j exceeds the maximum number Tap of samplings (precisely, the value which is the maximum number Tap of samplings minus one because the counter j starts from 0). This number is the number acquired by dividing maximum period of reference signal x by the sampling clock. This period is determined by the minimum rotating speed of engine 30. That is judged in order to determine if the filter factor $W_j$ of adaptive digital filter W has been updated by the required number after the drive signal y based on the filter factor $W_i$ is outputted at the step 104.

If the judgment at the step 110 is "no", the counter j is incremented at the step 111, and then the process is repeated from the step 108.

If the judgment at the step 110 is "yes", the process goes to the step 112, because it can be determined that the filter factor of adaptive digital filter W has been updated by the required number.

At the step 112, the DC component is removed from the series (sequence of numbers) consisting of filter factors $W_i$.

At the next step 113, it is judged whether or not any filter factor $W_i$ exceeds the ceiling value $W_{max}$ of the drive signal corresponding to the maximum controlling force which the electromagnetic actuator 10 can output. If not, the process goes to the step 114, where the correction factor β is set to "1". If it does, the process goes to the step 115, where the correction factor β is set to a number larger than "0" but smaller than "1".

Specifically at the step 115, the result of multiplication of each filter factor $W_i$ by the correction factor β is set to a value below the ceiling value $W_{max}$ but near it without limit.

At the next step 116, each filter factor $W_i$ is multiplied by the correction factor β, and the filter factor $W_i$ is replaced by the result of the multiplication.

The steps 112-116 are executed for the following reason. If a drive signal y were generated by using the filter factor $W_j$ as updated at the step 108, and if there is a ceiling value for the drive signal y which can be outputted, due to the characteristics of controller 20, electromagnetic actuator 10, etc., the drive signal y which exceeds the ceiling value would be forcedly corrected to this value, while the drive signal y which does not would be outputted as it is, and consequently this would be an equivalent to the drive signal y on which (higher) harmonic components, not existing actually in it, are superimposed, so that the vibration damping control may be deteriorated.

In other words, by executing the steps 112-116, if the drive signal y exceeds the ceiling value, the drive signal y as a whole is contracted (reduced) in the same form and only its level is corrected, thereby to easily avoid being superimposed by unnecessary harmonic components.

After the step 116 is finished, the process goes to the step 117, where the counter i is incremented. Thereafter, when the time corresponding to a specified sampling clock interval has passed after the step 104 had been previously executed, the process returns to the step 104 and the above steps are repeated.

At the step 109, however, if it is judged that the reference signal x has been inputted, the process returns to the step 103 and the above steps are executed again.

As a result of the repetition of such a process, the controller 20 supplies the electromagnetic actuator 10 of engine mount 1 with the filter factors $W_i$ of adaptive digital filter W in order as the drive signal y, at specified sampling clock intervals from the point of time when the reference signal x is inputted. As a result, magnetic force is produced in the exciting coil 10B in accordance with the drive signal y. Because the magnetic path member 14 is already given a certain magnetic force by the permanent magnet 10C, it can be considered that the magnetic force of exciting coil 10B acts to strengthen or weaken the magnetic force of permanent magnet 10C. In other words, when the exciting coil 10B is not supplied with the drive signal y, the magnetic path member 14 and the pressure plate 11, which is fixed to it, are displaced to the neutral position with the elastically supporting force (bearing power) of flat spring 13 and the magnetic force of permanent magnet 10C balanced with each other. In this neutral state, if the exciting coil 10B is supplied with the drive signal y, and if this signal causes the exciting coil 10B to produce a magnetic force opposite in polarity to that of permanent magnet 10C, then the pressure plate 11 and magnetic path member 14 are so displaced as to be further spaced from the electromagnetic actuator 10. Contrariwise, if the magnetic forces of exciting coil 10B and permanent magnet 10C coincide in polarity, the pressure plate 11 and magnetic path member 14 are so displaced as to be less spaced from the electromagnetic actuator 10.

Thus, the pressure plate 11 can be vertically displaced by the magnetic force produced by the electromagnetic actuator 10. As the pressure plate 11 is displaced vertically, the volume of main fluid chamber 18 change. Because this change in volume deforms the spring in the expanding direction of elastic support material 3, active bearing powers in opposite directions are produced in the engine mount 1. Each filter factor $W_i$ of adaptive digital filter W, which becomes the drive signal y, is sequentially updated by means of the equation (1) in accordance with synchronous filtered-X LMS algorithm. Therefore, after each filter factor $W_i$ of adaptive digital filter W converges at an optimum value when a certain time has passed, the idle vibration and internal sound vibration transmitted from the engine 30 through the engine mount 1 to the support member 35 side are damped by supplying the drive signal y to the engine mount 1.

Particularly in this embodiment, the main fluid chamber 18 communicates through the orifice 16A with the auxiliary fluid chamber 19, and the resonance frequency of the fluid resonance system is made equal to the idle vibration frequency. Therefore, if the frequency of the vibration inputted from the engine 30 side into the engine mount 1 is near to the idle vibration frequency, fluid resonance occurs between the main and auxiliary fluid chambers 18 and 19 through the orifice 16A, when the electromagnetic force of electromagnetic actuator 10 vertically moves the pressure plate 11 and the volume of main fluid chamber 18 changes. As a result, the same electromagnetic actuator 10 can produce greater controlling force. In particular, control vibration of large amplitude can be superimposed on the idle vibration of large amplitude generated on the engine 30 side, so that excellent vibration isolation can be effected.

In this case the greater the passive force produced by the fluid resonance is, the more preferable it is. However, because the magnitude of this force depends on the mass of the fluid resonance system, the volumes of orifice 16A and auxiliary fluid chamber 19 are particularly significant. In this connection, by forming the inner tube 4 of this embodiment with the neck 4c, a sufficient closed space is formed around the inner tube 4. Arranged in this space are the orifice 16A and auxiliary fluid chamber 19. Therefore, without necessity for the engine mount 1 to be large in size, it is possible to form the orifice 16A and auxiliary fluid chamber 19 of large volume. This provides sufficient mass of the fluid resonance system, so that control vibration of large amplitude can be generated. The large volume has the advantage of restraining the internal pressure in the main fluid chamber 18 from extremely building up, even if high load is applied to the elastic support material 3. Additionally in this embodiment, because the orifice-defining member 16 is made of elastic material, it is easy to form the orifice 16A of desired shape and volume.

Thus, the smaller the controlling force needed for the electromagnetic actuator 10 is, the smaller the electromagnetic actuator 10 can be. In addition, even if the orifice 16A etc. are enlarged in volume, there is no need for the whole engine mount 1 to be large in size. If the electromagnetic actuator 10 can be small, it is also possible to reduce the size of permanent magnet 10C, which is relatively expensive. This results in lower costs.

While the damping characteristic of the fluid resonance system is also important, in the construction of this embodiment, by properly adjusting the area in lateral cross section of the passage 16a, which interconnects the orifice 16A and main fluid chamber 18, it is possible to reduce the suspended log ratio r of the model shown in FIG. 4 and, therefore, to easily obtain a desired damping characteristic.

In this embodiment, the main fluid chamber 18 is small in diameter, and the pressure plate 11 is located outside the cylindrical cavity 3b, which defines the main fluid chamber 18. Therefore, it is possible to enlarge the area of the surface of pressure plate 11 which is projected toward the main fluid chamber 18. Consequently, it is possible to make the effective pressure-receiving area $A_u$ on the elastic support material 3 side smaller than that $A_p$ on the pressure plate 11 side ($A_u < A_p$), and comparatively increase the ratio R of $A_p$ to $A_u$ ($A_p/A_u$). As a result, when the displacement of pressure plate 11 is transmitted through the variation in volume of main fluid chamber 18 to the spring in the expanding direction of elastic support material 3, the displacement is amplified. The amplified displacement can vertically greatly displace the connector 2, although a certain amount of it is absorbed in the elastic support material 3. This means that the small electromagnetic actuator 10 can generate control vibration of large amplitude. This can also reduce the size of electromagnetic actuator 10, thereby contributing to the reduction in size of the whole engine mount 1.

The cylindrical cavity 3b of elastic support material 3, which defines the main fluid chamber 18, is formed by molding the elastic support material 3 by vulcanization with a die inserted, and removing the die after the molding. In this embodiment, the cylindrical cavity 3b is smaller in diameter than the inner diameter of neck 4c, so that it is not particularly difficult to form the cylindrical cavity 3b.

If an attempt were made to simply reduce the effective pressure-receiving area $A_u$ on the elastic support material 3 side, the elastic support material 3 would be small in volume, so that even its spring in the supporting direction might be hard. In this embodiment, the upper portion of inner tube 4 diverges or expands radially, and the elastic support material 3 is bonded to the inner surface of the expanded portion. This construction makes the elastic support 3 sufficient in volume, and its peripheral portion thicker so as to lower the spring constant of its spring in the supporting direction. As a result, it is possible to prevent the transmission rate of the vibration from the engine 30 side to the support member 35 side from lowering. Contrariwise, it is also easy to raise the spring constant of the spring in the expanding direction of elastic support material 3. Therefore, it is possible to set the characteristics of the springs in the supporting and expanding directions within desired ranges, respectively.

If the upper surface of pressure plate 11 is a plane in parallel with the flat portion 4d, the pressure plate 11 has a maximum effective pressure-receiving area for its equivalent scale. Therefore, for the same effective pressure-receiving area, the pressure plate 11 can be minimum in scale, thereby contributing to the reduction in size of the apparatus.

In this embodiment, the movable member is formed by combining the pressure plate 11 for a pressure-receiving function, the flat spring 13 for a spring function and the magnetic path member 14 for a magnetic circuit function. Therefore, each function can be adjusted individually, so that desired characteristics can be easily realized. In particular, the pressure plate 11 is elastically supported by the flat spring 13 and fastened to its central portion, while the periphery of flat spring 13 is fixed to the actuator case 6. Therefore, even if the flat spring 13 is thickened to improve its durability, it is possible to amplify the displacement of pressure plate 11, without need to enlarge the electromagnetic actuator 10.

The pressure plate 11 of this embodiment is covered entirely by the elastic film 11a, the periphery of which is fixed to the actuator case 6. Therefore, there is no need of structure or trouble to form a seal groove in, for example, the actuator case flange 6a and put a seal ring in it. This has the advantage of reducing the costs. Particularly in this embodiment, the lower side of the flat portion 4d, including the peripheral portion 4e, is wholly covered by the elastic film 3a. The portion covered by the elastic film 3a is also gripped by the bottom portion 5c, so that a better sealing function is attained.

Because the magnetic path member 14 is a member separate from the pressure plate 11, it is possible to easily position the part of the magnetic circuit near the electromagnetic actuator 10, thereby increasing its output efficiency.

In this embodiment, the stopper 11b is formed at the lower peripheral portion of pressure plate 11. Even if the output efficiency drops when the pressure plate 11 inclines, or for other reason, the stopper 11b early functions against the inclination, so that the inclination of pressure plate 11 can be rectified at an early stage. In addition, the rubbery elastic stopper 11b is located far from the electromagnetic actuator 10, which constitutes a heat source. This has the advantage of improving the durability of stopper 11b as well.

Because the magnetic path member 14 is a separate member, the distance between the peripheral portion of pressure plate 11 and the flat spring 13 has no relation to the output efficiency, and can therefore be wider. The wider space enables the stopper 11b to be thicker and softer. The softer stopper 11b can be collapsed and thinned by small force. Therefore, it is possible to amplify the displacement of pressure plate 11, without need to increase the output of electromagnetic actuator 10.

There is no need to cut or machine the magnetic path member 14, the electromagnetic actuator yoke 10A, etc. in order to form the stopper 11b. Therefore, it is not possible that the stopper 11b will lower the output efficiency of electromagnetic actuator 10.

Because the stopper 11b is fixed to the pressure plate 11, it is not possible that dislocation will occur, and there is no particular need of trouble in assembling the apparatus. In addition, the stopper 11b can be formed simply by thickening in a ring a part of elastic film 11A under the pressure plate 11, without need to greatly raising the production costs.

In this embodiment, the outer tube 5 can reinforce the inner tube 4, the conical wall 4b of which reduces the strength of inner tube 4 against vertical loads. The outer tube 5 can thus improve the durability of engine mount 1 as a whole. The outer tube 5 can also protect the diaphragm 17 etc., and therefore has the advantage of preventing them from being damaged by flying stones etc.

Thus, the structure of this embodiment enables the engine mount 1 to be small, and control vibration of large amplitude to be generated. This is very advantageous to the engine mount 1 of a vehicle in which the idle vibration of large amplitude should be damped and the mounting space is greatly limited.

Figure 7:
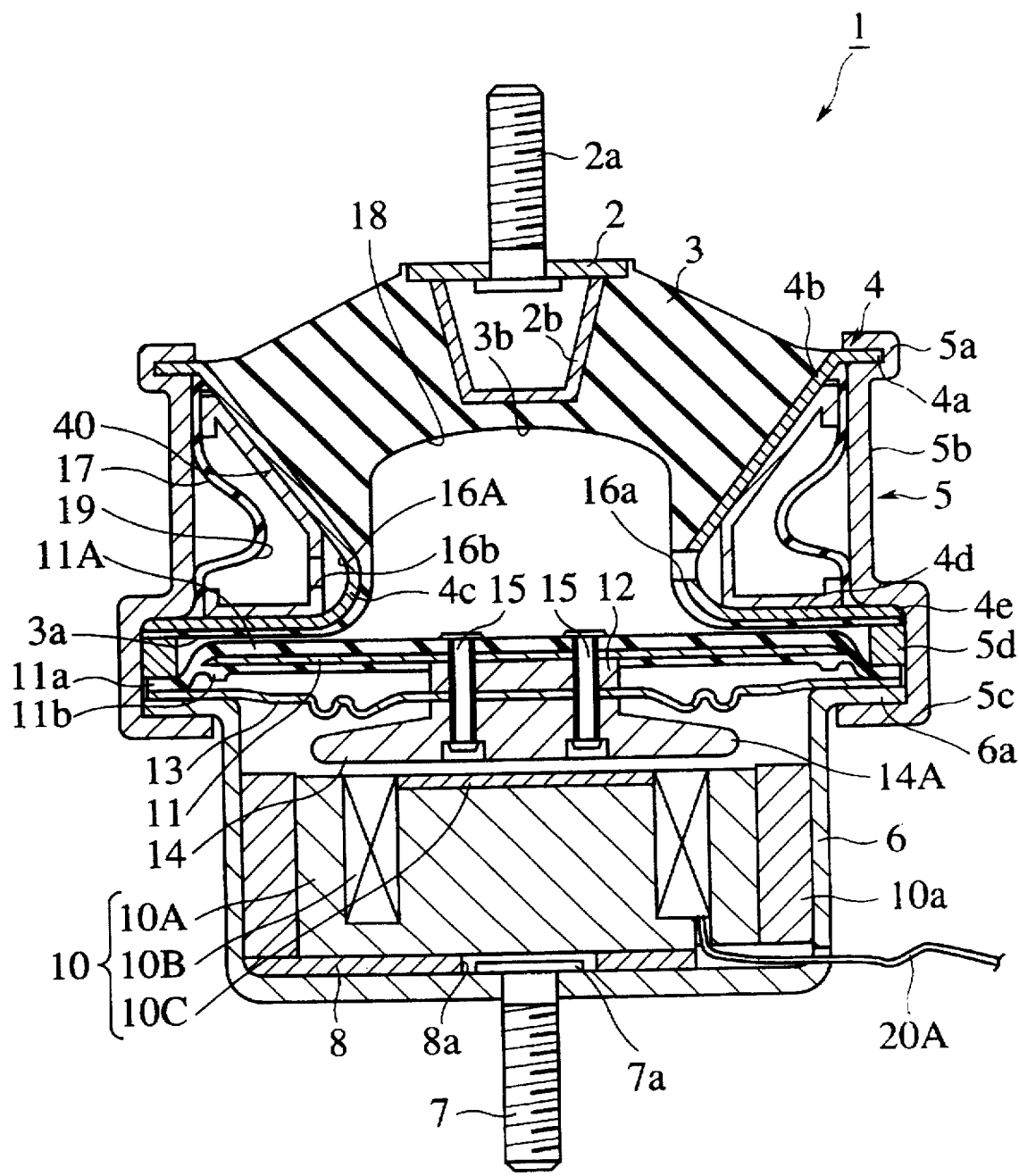
FIG. 7 is a side view in axial cross section of an engine mount according to the second embodiment.

FIG. 7 shows the second embodiment of this invention, where a vibro-isolating support according to the present invention is applied to a so-called active engine mount, which actively damp the vibration transmitted from the engine on a vehicle to the vehicle body, similarly to the first embodiment. FIG. 7 is a view in cross section of engine mount 1 similar to FIG. 1 of the first embodiment. Because the other overall construction and control are substantially the same as in the first embodiment, the illustrations and explanations of them are omitted. In addition, the parts similar to those in the first embodiment are given the same numerals, and the duplicate explanations of them are omitted.

This embodiment is characterized by an orifice-defining member 40 made of a metal tube, while the member 16 of the first embodiment is made of elastic material. Specifically, the orifice-defining member 40 is a tube adhering to the outer surface of an inner tube 4, and an annular space as an orifice 16A is formed between the inner tube neck 4c and the orifice-defining member 40, similarly to the first embodiment. The orifice-defining member 40 is also formed with a passage 16b similarly to the first embodiment.

The orifice-defining member 40 can reinforce the inner tube 4, which is disadvantageous in strength against vertical loads. This has the advantage of further improving the durability of engine mount 1 as a whole.

The other operations and advantages are substantially the same as in the first embodiment.

Figure 8:
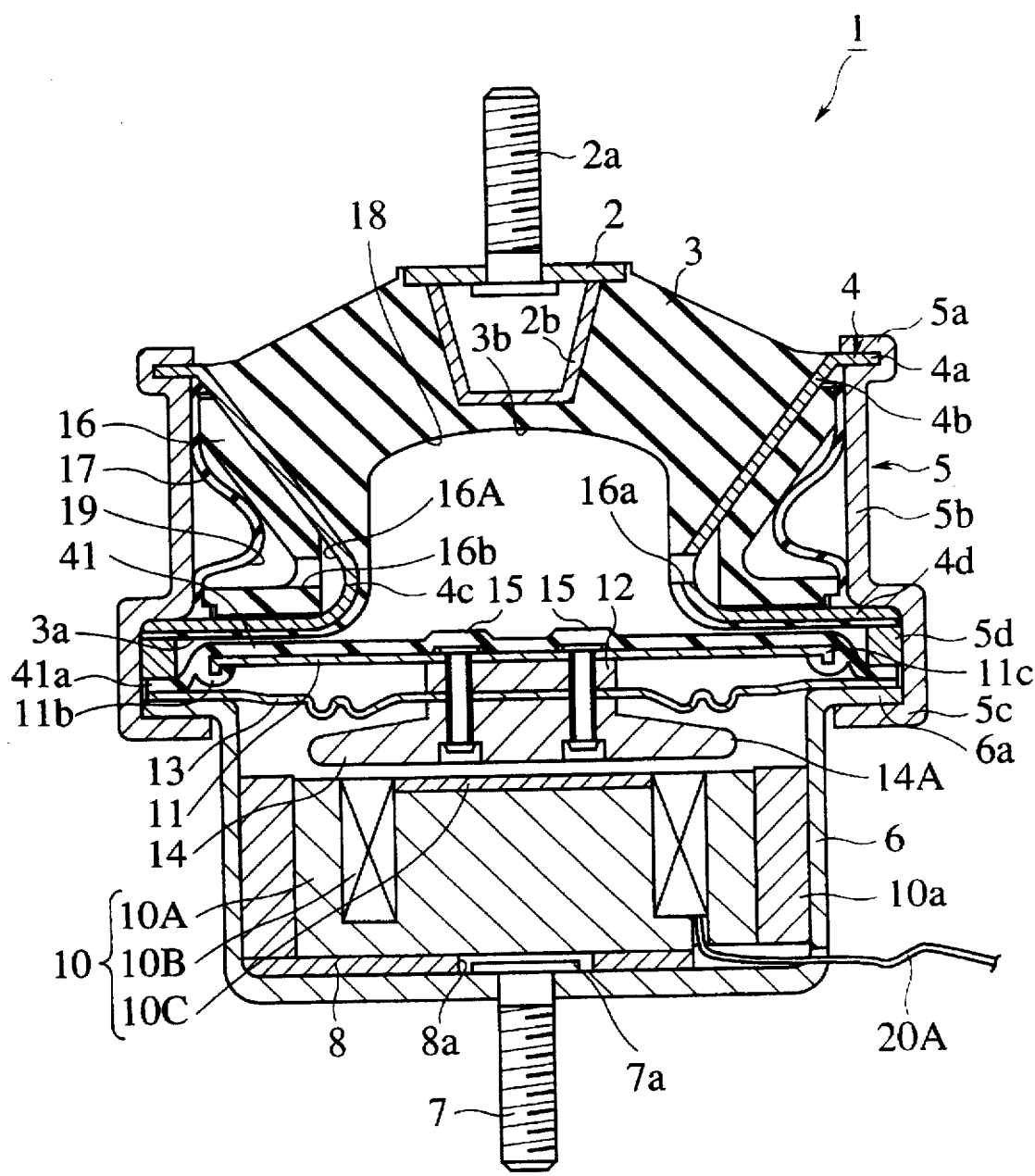
FIG. 8 is a side view in axial cross section of an engine mount according to the third embodiment.

FIG. 8 is a view in cross section of an engine mount 1 similar to FIG. 1, and shows the third embodiment of this invention. Because the other overall construction and control are substantially the same as in the first embodiment, the illustrations and explanations of them are omitted. In addition, the parts similar to those in the previous embodiments are given the same numerals, and the duplicate explanations of them are omitted.

In this embodiment, the pressure plate 11 is not entirely covered by an elastic film. The periphery of pressure plate 11 is bent downward, forming an annular portion or rim 11c. An elastic material is bonded by vulcanization to the rim 11c, forming a stopper 11b. The pressure plate 11 is fixed to a magnetic path member 14 etc. by rivets 15. The upper surface of pressure plate 11 is covered by a circular elastic film 41. The elastic film 41 includes a peripheral portion 41a laid on the peripheral portion of a flat spring 13. These peripheral portions are held by the bottom portion 5c of an outer tube 5.

The heads of rivets 15 are located outside the main fluid chamber 18, and the elastic film 41 has no holes through which the rivets 15 extend, so that the sealing function is further improved.

The other operations and advantages are substantially the same as in the previous embodiments.

Figure 9:
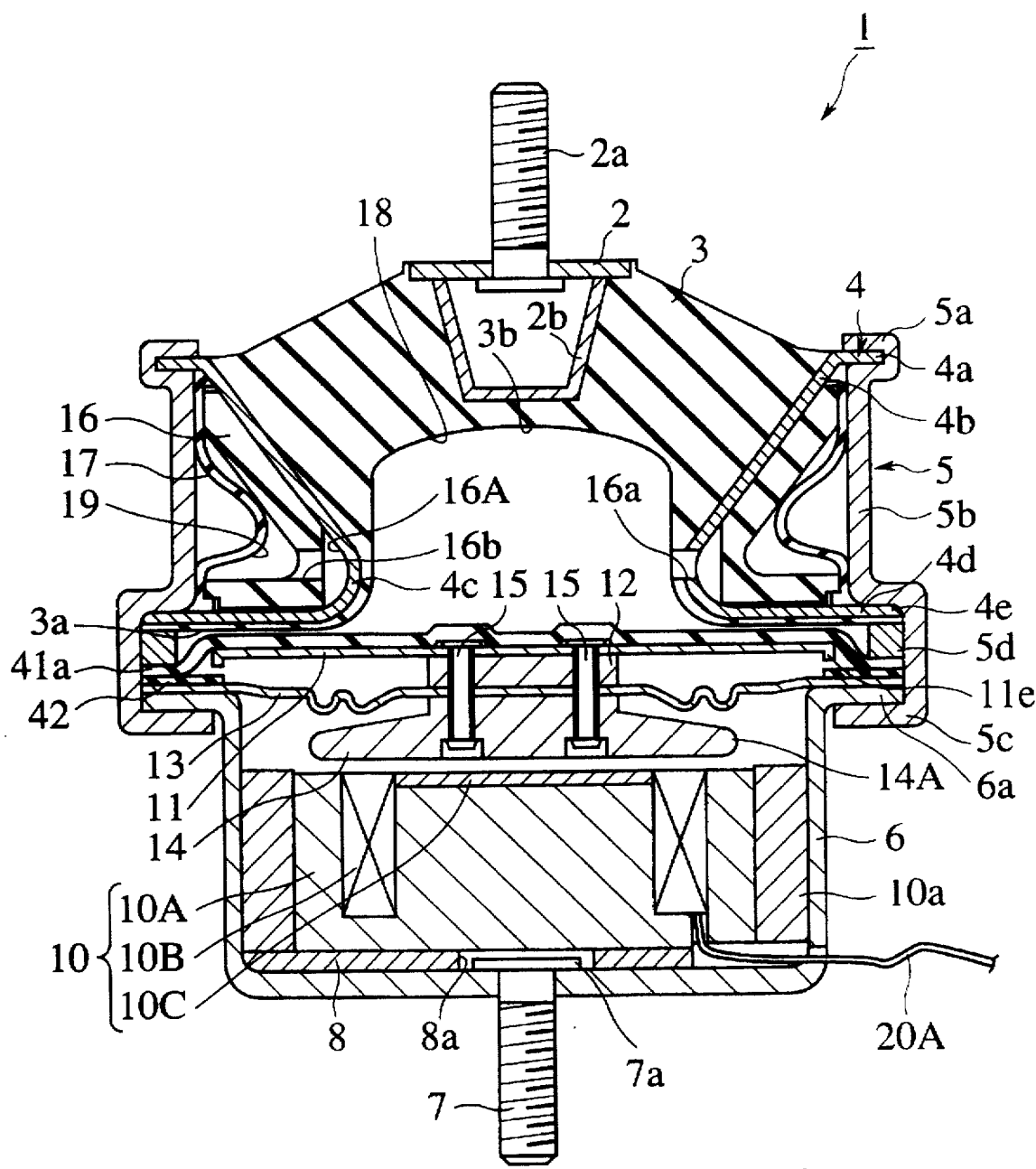
FIG. 9 is a side view in axial cross section of an engine mount according to the fourth embodiment.

FIG. 9 is a view in cross section of an engine mount 1 similar to FIG. 1, and shows the fourth embodiment of this invention. Because the other overall construction and control are substantially the same as in the first embodiment, the illustrations and explanations of them are omitted. In addition, the parts similar to those in the previous embodiments are given the same numerals, and the duplicate explanations of them are omitted.

In this embodiment, the periphery of pressure plate 11 is bent downward, forming a rim 11e similar to that 11c in FIG. 8, but the stopper 11b is omitted. Interposed between the flat spring 13 and the peripheral portion 41a of elastic film 41 is an annular elastic film 42 as a stopper, which faces the rim 11e.

The elastic film 42 functions as a stopper effectively and similarly to the previous embodiments. The elastic film 42 is an independent member, which may otherwise consist of two or more films. The stopper characteristics can be easily adjusted by properly selecting the thickness or the number of the films.

The other operations and advantages are substantially the same as in the previous embodiments.

Figure 10:
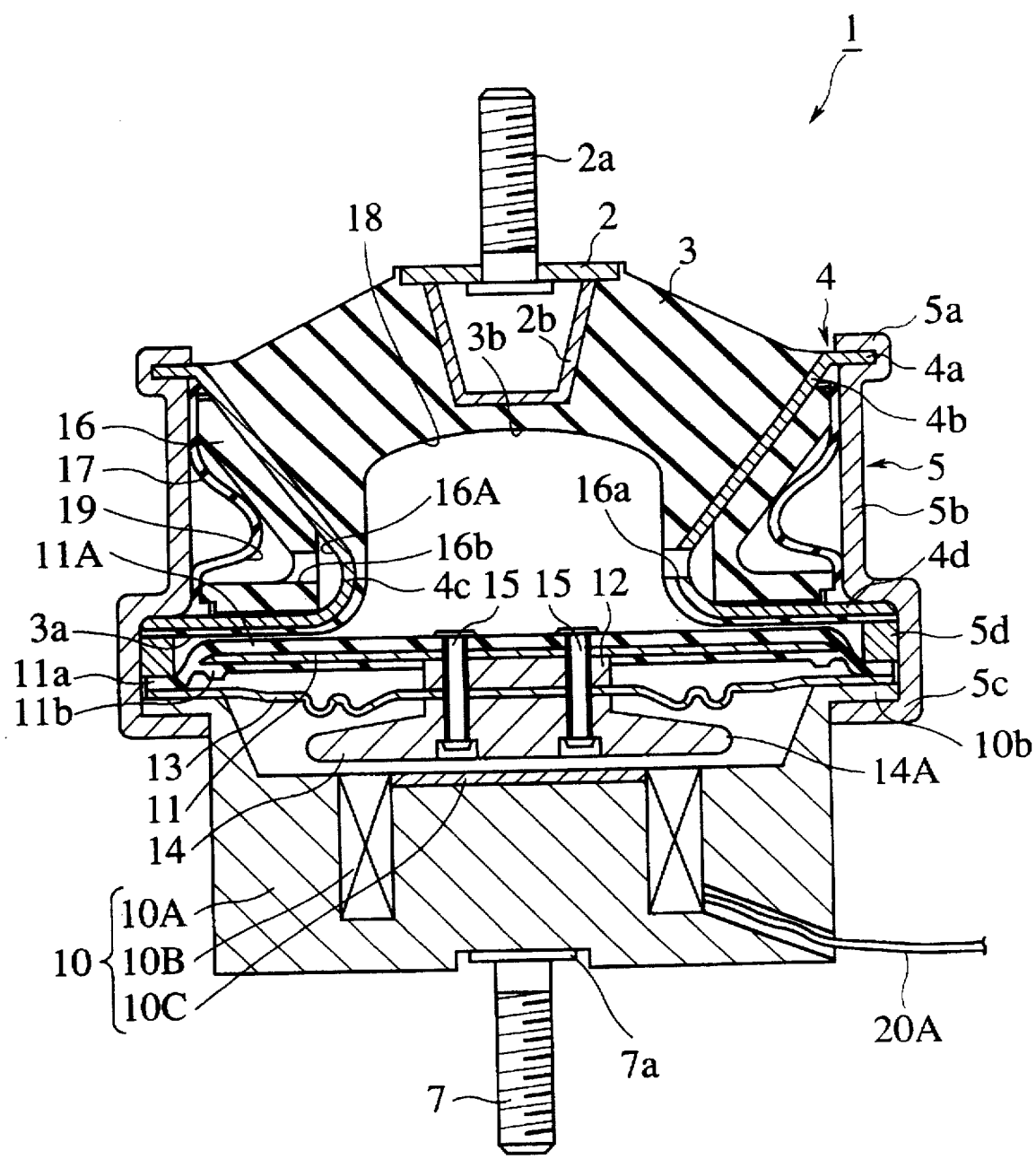
FIG. 10 is a side view in axial cross section of an engine mount according to the fifth embodiment.

FIG. 10 is a view in cross section of an engine mount 1 similar to FIG. 1, and shows the fifth embodiment of this invention. Because the other overall construction and control are substantially the same as in the first embodiment, the illustrations and explanations of them are omitted. In addition, the parts similar to those in the previous embodiments are given the same numerals, and the duplicate explanations of them are omitted.

In this embodiment, the electromagnetic actuator 10 is not contained in a case. Instead, the electromagnetic actuator yoke 10A has an upper peripheral portion, which extends upward and terminates in a radial top flange 10b. The flange 10b is joined to the bottom portion 5c of outer tube 5. The head 7a of mounting bolt 7 is fixed to the center of the bottom of yoke 10A.

Such structure has the advantage of reducing the number of parts in comparison with the structure of the first embodiment, thereby lowering the costs. The other operations and advantages are substantially the same as in the first embodiment.

Figure 11:
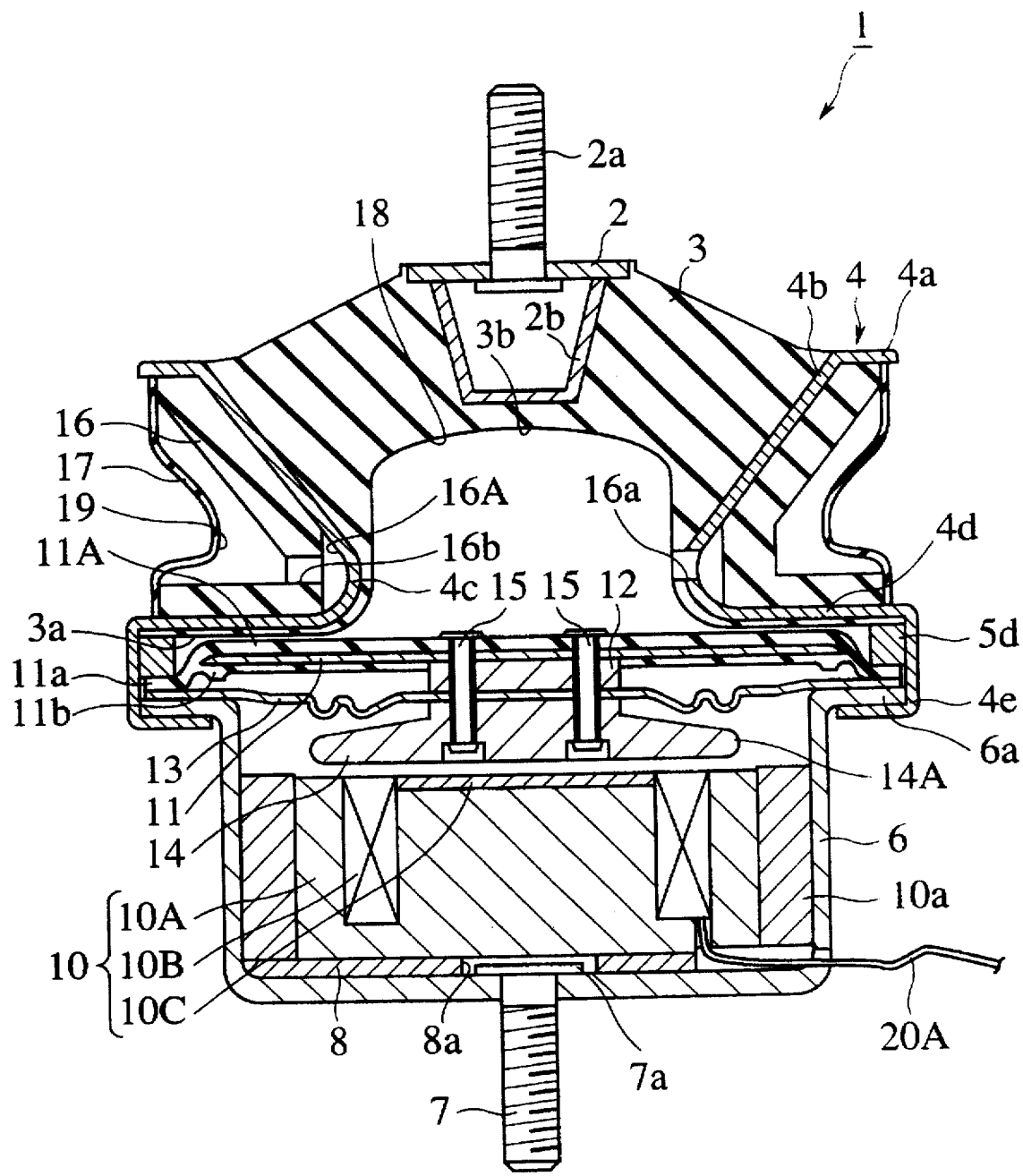
FIG. 11 is a side view in axial cross section of an engine mount according to the sixth embodiment.

FIG. 11 is a view in cross section of an engine mount 1 similar to FIG. 1, and shows the sixth embodiment of this invention. Because the other overall construction and control are substantially the same as in the first embodiment, the illustrations and explanations of them are omitted. In addition, the parts similar to those in the previous embodiments are given the same numerals, and the duplicate explanations of them are omitted.

In this embodiment, the outer tube 5 is omitted which is provided in each of the previous embodiments. Instead, the peripheral portion 4e of inner tube 4 is bent downward and then inward, and joined to the flange 6a of actuator case 6. The peripheral portion 4e grips the spacer 5d etc. The inner tube 4 is somewhat thick for sufficient strength.

Such structure has the advantage of reducing the number of parts. If there is no possibility that the diaphragm 17 etc. are damaged by flying stones etc., there is no need to protect the parts with an outer tube. Therefore, it is advantageous to adopt the structure of this embodiment. The other operations and advantages are substantially the same as in the first embodiment.

Figure 12:
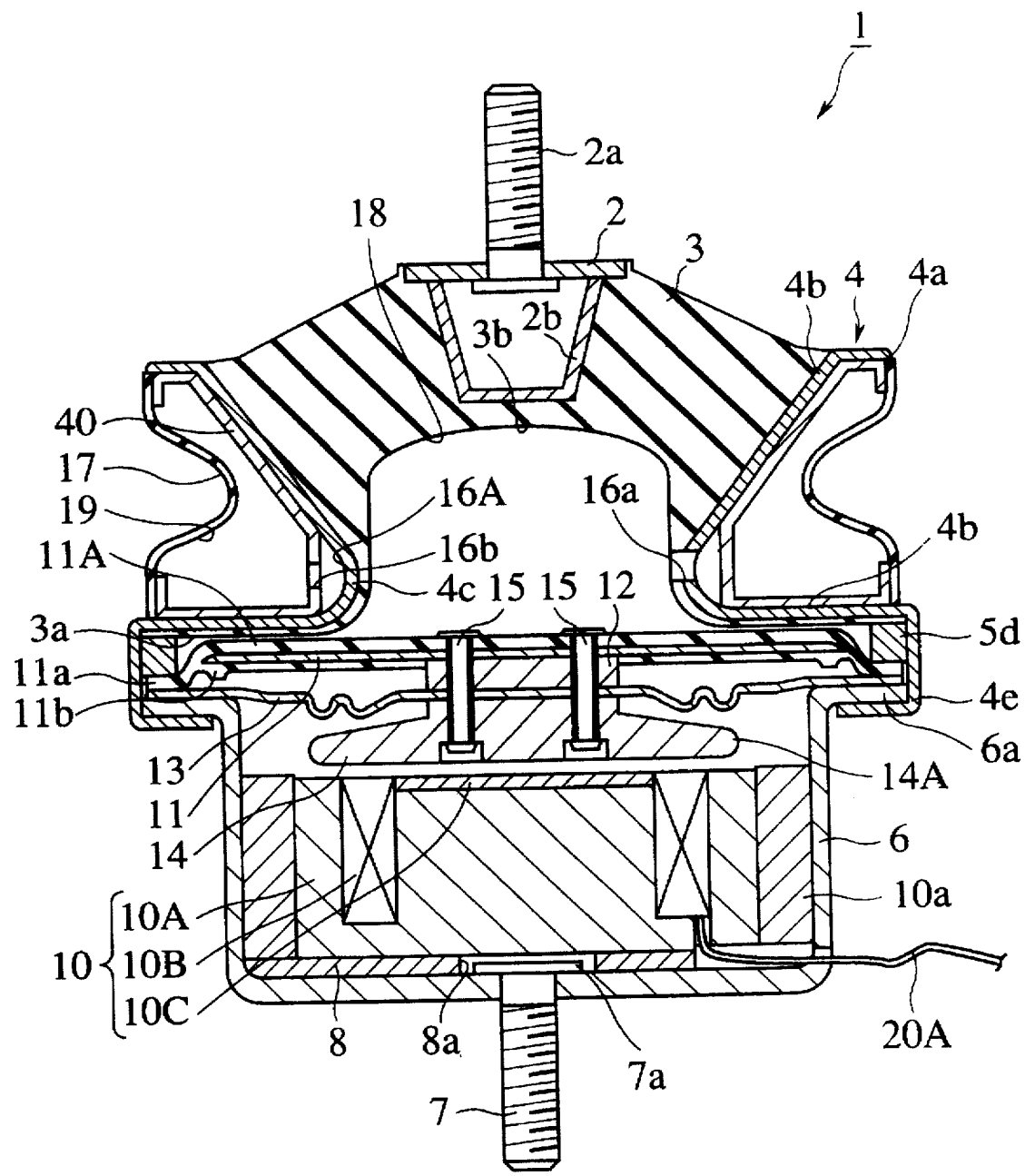
FIG. 12 is a side view in axial cross section of an engine mount according to the seventh embodiment.

FIG. 12 is a view in cross section of an engine mount 1 similar to FIG. 1, and shows the seventh embodiment of this invention. This embodiment is a combination of the second and sixth embodiments. Specifically, similarly to the second embodiment, the orifice-defining member 40 is a metal tube. In addition, similarly to the sixth embodiment, the outer tube is omitted, and the peripheral portion 4e of inner tube 4 is joined to the actuator case 6.

The orifice-defining member 40 can supplement the strength of inner tube 4, which is lowered by omitting the outer tube. The other operations and advantages are substantially the same as in the first embodiment.

Figure 13:
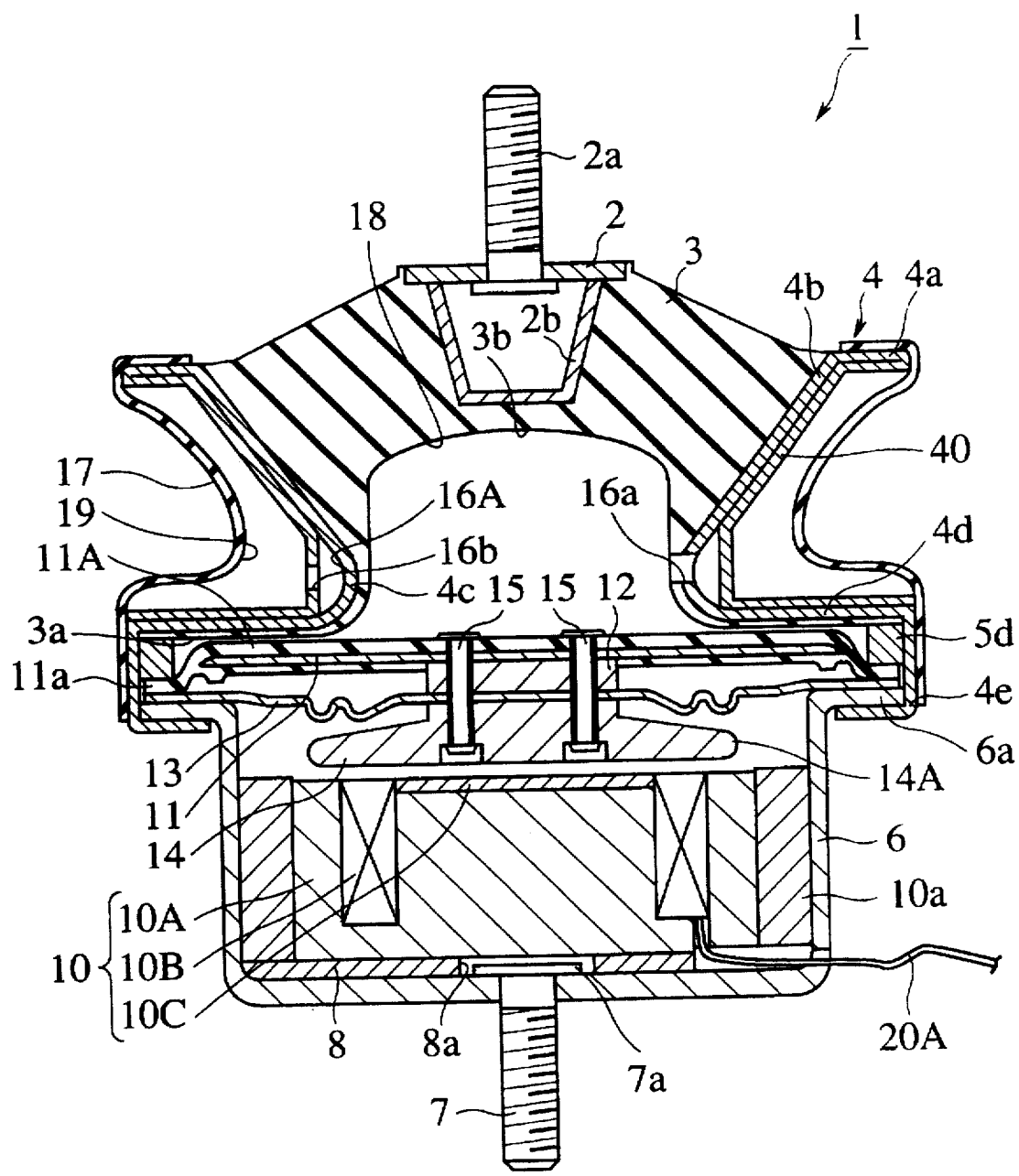
FIG. 13 is a side view in axial cross section of an engine mount according to the eighth embodiment.

FIG. 13 is a view in cross section of an engine mount 1 similar to FIG. 1, and shows the eighth embodiment of this invention. This embodiment is a further improvement in the seventh embodiment.

This embodiment is substantially the same as the seventh embodiment, but differs in that an orifice-defining member 40 is formed by bending as an extension from the top flange 4a of inner tube 4. In addition, the top and bottom portions of diaphragm 17 respectively covers the upper side of flange 4a and the outer side of peripheral portion 4e of inner tube 4.

Such structure has the advantage of further reducing the production costs. The structure of diaphragm 17 has the advantage of improving the adhesion between the diaphragm 17 and inner tube 4, thereby improving the durability in terms of airtightness etc. The other operations and advantages are substantially the same as in the first embodiment.

Figure 14:
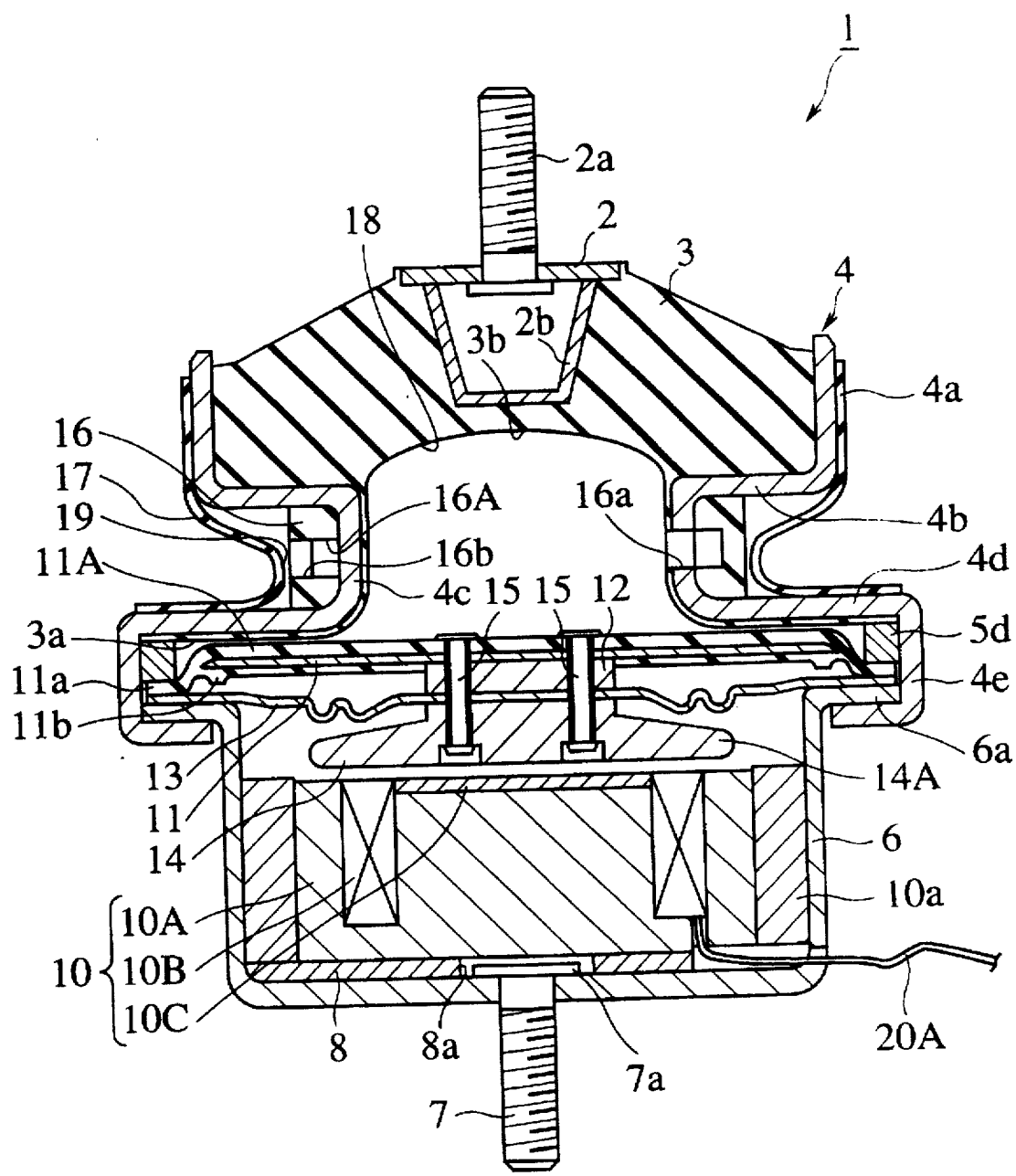
FIG. 14 is a side view in axial cross section of an engine mount according to the ninth embodiment.

FIG. 14 is a view in cross section of an engine mount 1 similar to FIG. 1, and shows the ninth embodiment of this invention. Because the other overall construction and control are substantially the same as in the first embodiment, the illustrations and explanations of them are omitted. In addition, the parts similar to those in the previous embodiments are given the same numerals, and the duplicate explanations of them are omitted.

In this embodiment, the outer tube 5 is omitted, and the shape of inner tube 4 differs from those in the previous embodiments. Specifically, the inner tube 4 includes a top axial portion 4a, a middle axial portion or neck 4c smaller in diameter than it, and an upper radial portion 4b interconnecting them. The elastic support material 3 is bonded to the inner side of top axial portion 4a and the upper side of upper radial portion 4b. The inner tube 4 is somewhat thick for sufficient strength.

The shape of orifice-defining member 16 also differs from that in the first embodiment. Specifically, the orifice-defining member 16 is made of cylindrical elastic material, and fitted around the neck 4c. The orifice-defining member 16 has an annular groove or orifice 16A formed in its inner periphery.

There is a sufficient space around the neck 4c. By arranging the orifice 16A and auxiliary fluid chamber 19 in this space, it is possible to attain substantially the same operations and advantages as in the first embodiment. In addition, the elastic support material 3 can be sufficient in volume. In this connection as well, it is possible to attain substantially the same operation and advantages as in the first embodiment. The other operations and advantages are also substantially the same as in the first embodiment.

Figure 15:
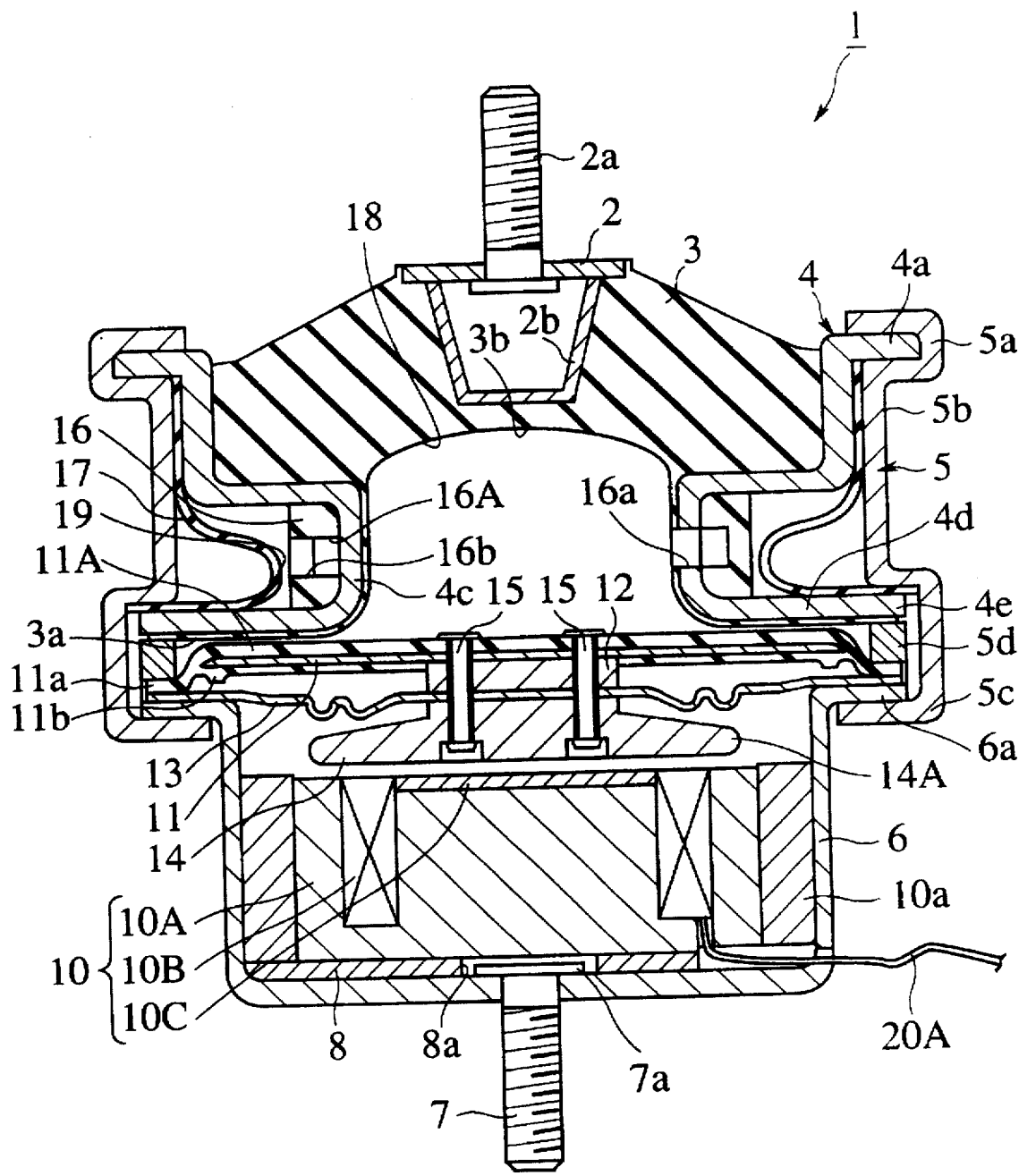
FIG. 15 is a side view in axial cross section of an engine mount according to the tenth embodiment.

FIG. 15 is a view in cross section of an engine mount 1 similar to FIG. 1, and shows the tenth embodiment of this invention. This embodiment includes an outer tube 5 in addition to the ninth embodiment.

Specifically, the inner tube 4 has a top radial flange 4a expanding outward, which is joined to the top portion 5a of outer tube 5. The bottom peripheral portion 4e of inner tube 4 is gripped together with the spacer 5d etc. by the bottom portion 5c of outer tube 5. In essence, this embodiment is a combination of the structure of the first embodiment and the inner tube 4 of the ninth embodiment. In this embodiment, however, the inner tube 4 and outer tube 5 are somewhat thicker.

Because such structure further increases the axial strength of engine mount 1, the engine mount is a suitable apparatus for supporting a heavy engine, for example. The other operations and advantages are substantially the same as in the first embodiment.

Figure 16:
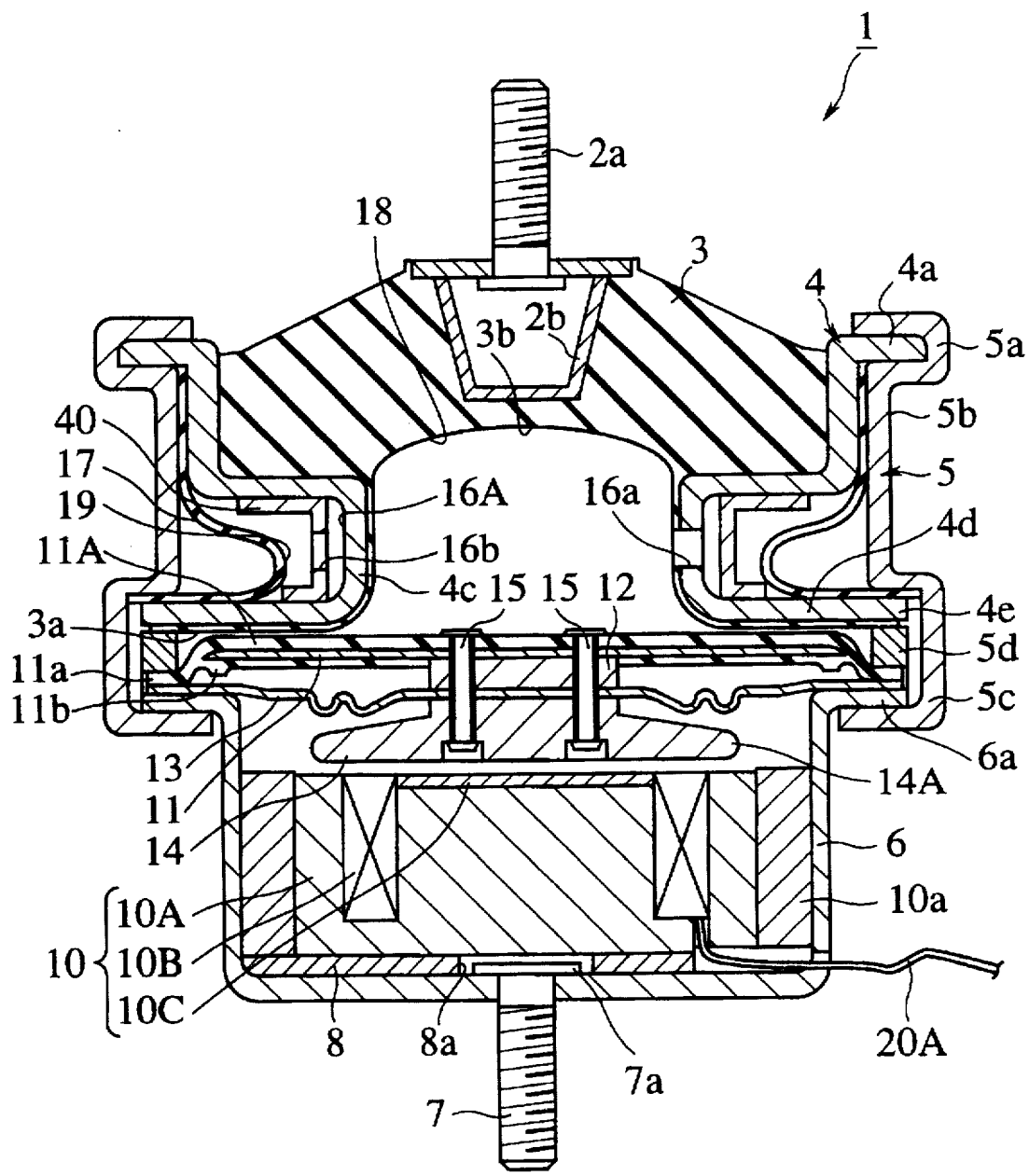
FIG. 16 is a side view in axial cross section of an engine mount according to the eleventh embodiment.

FIG. 16 is a view in cross section of an engine mount 1 similar to FIG. 1, and shows the eleventh embodiment. This embodiment replaces the orifice-defining member 40 in the tenth embodiment with an orifice-defining member 40 made of a metal tube.

Because the metal tube still further increases the axial strength of engine mount 1, the engine mount is suitable to support a very heavy engine. The other operations and advantages are substantially the same as in the first embodiment.

Figure 17:
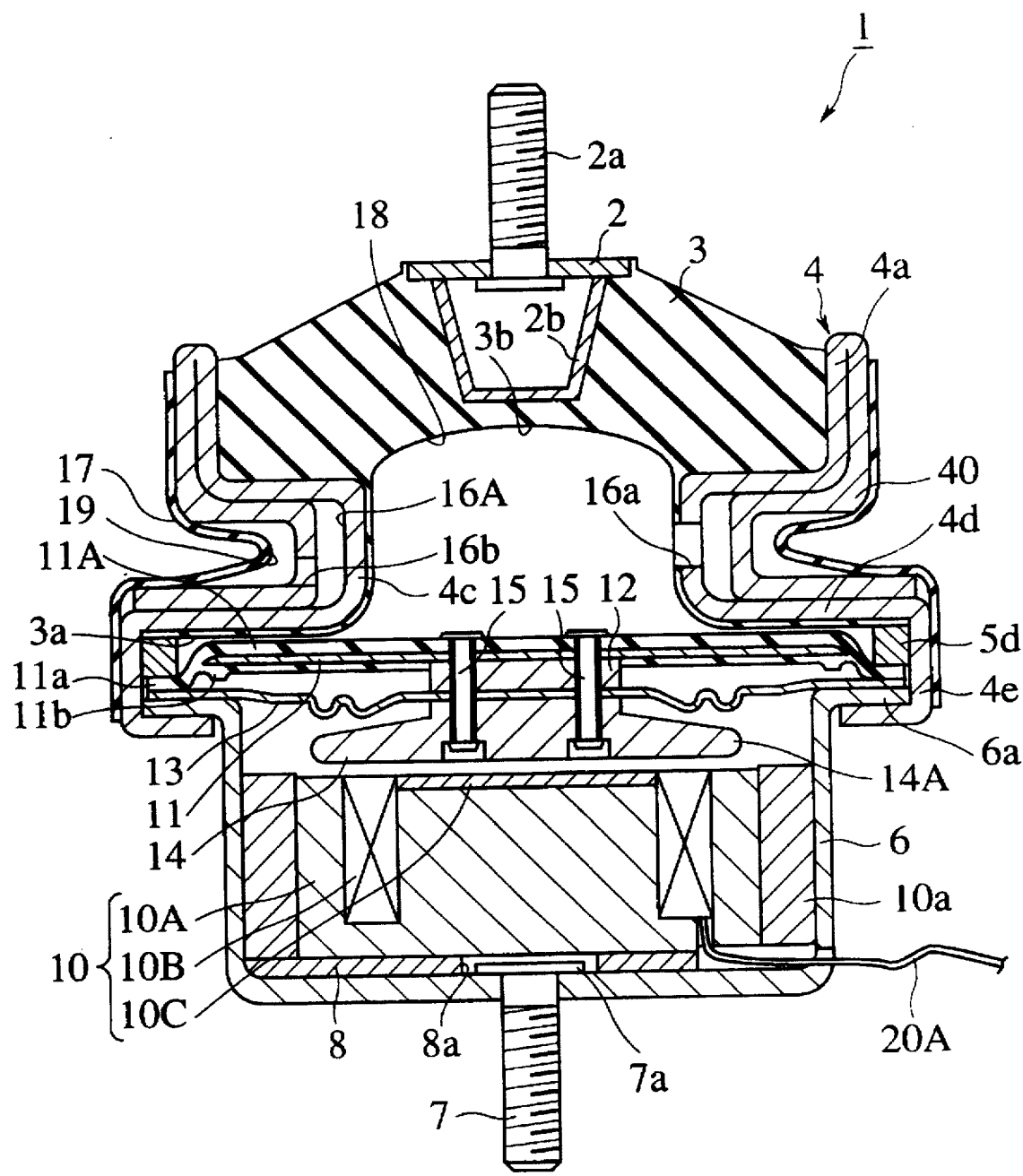
FIG. 17 is a side view in axial cross section of an engine mount according to the twelfth embodiment.

FIG. 17 is a view in cross section of an engine mount 1 similar to FIG. 1, and shows the twelfth embodiment. This embodiment is an improvement in the eleventh embodiment.

In this embodiment, the outer tube 5 is omitted which is provided in the eleventh embodiment. In addition, an orifice-defining member 40 is formed by bending as an extension from the top portion 4a of inner tube 4.

Such structure has the advantage of reducing the production costs. The other operations and advantages are substantially the same as in the first embodiment.

In each of the embodiments, a vibro-isolating support according to the present invention is applied to an engine mount 1 supporting an engine 30. The invention should, however, not be limited to vibro-isolating supports for engine mounts, but may otherwise, be vibro-isolating supports for machine tools etc., for example, which vibrate.

In each of the embodiments, the inner tube 4 is V-shaped or cranked in axial cross section to form the neck 4c. Otherwise, the corner/s of the V shape or cranked shape may be rounded to form a U shape in essence for the same purpose.

In each of the embodiments, the drive signal y is generated in accordance with synchronous filtered-X LMS algorithm, to which the applicable algorithm should, however, not be limited. For example, ordinary filtered-X LMS algorithm or frequency-domain LMS algorithm may be applied. If the characteristics of the system are stable, the drive signal y may be generated through an analog filter or a digital filter having a fixed factor, without using adaptation algorithm such as LMS algorithm.

As explained hereinbefore, in accordance with one invention, the elastic support material is joined to the vibrating body side or the supporting body side through the tubular member having the neck. The main fluid chamber is located inside the tubular member, outside which the auxiliary fluid chamber and orifice are located. Therefore, it can be avoided that the auxiliary fluid chamber or the orifice even of relatively large volume greatly beetles out of the apparatus. Accordingly, it is possible to reduce the size of the vibro-isolating support without reducing its vibro-isolating characteristics.

In accordance with another invention, it is easy to form the tubular member with a neck.

In accordance with another invention, the structure in which the tubular member with a neck is interposed makes the elastic support material sufficient in volume, so that its rigidity in the supporting direction is low. Therefore, the transmissibility of vibration is not lowered.

In accordance with another invention, it is possible to produce controlling force of large amplitude. Therefore, it is possible to diminish vibration of large amplitude such as the idle vibration of a diesel vehicle.

Particularly, in accordance with another invention, it is possible to surely produce controlling force of large amplitude.

In this case, in accordance with another invention, it is possible to realize an equivalent effective pressure-receiving area with the movable member of minimum scale. Therefore, it is possible to reduce the size of the apparatus.

In accordance with another invention, the damping characteristics of the fluid resonance system are improved, and it is possible to lower the actuator load when control which utilizes fluid resonance is made. Therefore, it is possible to reduce the actuator size, so that the apparatus is even smaller.

In this case, in accordance with another invention, it is easy to adjust the resonance frequency of the fluid resonance system, and also to form orifices of different characteristics. It is therefore possible to lower the production costs. In accordance with another invention, the orifice-defining member bears part of the load on the tubular member, and reinforces the tubular member. As a result, the durability of the vibro-isolating support is improved.

In accordance with another invention, such structure has the advantage of further reducing the production costs.

In accordance with another invention, even if the flat spring is thickened for higher durability, it is possible to largely displace the pressure plate with relatively small force. Therefore, it is possible to make the actuator even smaller.

In accordance with another invention, the elastic film on the pressure plate can prevent the fluid in the main fluid chamber from leaking to the flat spring side of the pressure plate. As a result, there is no need of machining for a seal groove etc., so that the costs are low.

In this case, in accordance with another invention, direct collision of the pressure plate and flat spring is avoided, so that noise etc. are prevented.

In accordance with another invention, the stopper early functions against the pressure plate inclination, so that the inclination can be early rectified. In addition, it is possible to adopt soft and elastic material as the stopper, so that the stopper can be collapsed to be thin by small force. Further, there is no need to cut any important portion of the movable member or the actuator. Therefore, without need to reduce the pressure plate displacement, it is possible to reduce the apparatus size by adopting a small actuator.

In this case, in accordance with another invention, stopper dislocation etc. can hardly occur, and the trouble or labor for assembly can be less, so that the costs can be reduced.

In accordance with another invention, it is easy to adjust the stopper characteristics, and therefore possible to realize the desired characteristics.

In accordance with another invention, the pressure-receiving function of the movable member for receiving the internal pressure of the main fluid chamber and the function for forming part of the magnetic circuit are separate. As a result, it is possible to individually design and realize the desired functions, easily realize the desired characteristics, and easily raise the electromagnetic actuator output efficiency, so that a small electromagnetic actuator can be adopted.

In accordance with another invention, it is possible to omit parts such as a case for the electromagnetic actuator, so that the costs are lowered.

In accordance with another invention, the outer tube functions as a reinforcement, so that the vibro-isolating support is improved in durability. The outer tube also protects the diaphragm etc., which define the auxiliary fluid chamber, from being damaged.

In accordance with another invention, it is possible to reduce the controlling force necessary for the actuator. Therefore, it is possible to well diminish large vibration with even a small actuator, so that it is easy to apply the vibro-isolating support to even where the mounting space is largely limited.

Particularly, in accordance with another invention, it is possible to diminish idle vibration of relatively large amplitude with a small actuator. Therefore, it is easy to apply the vibro-isolating support to a vehicle with a largely limited mounting space.

It should be understood that many modifications and adaptations of the invention will become apparent to those skilled in the art and it is intended to encompass such obvious modifications and changes in the scope of the claims appended hereto.

What is claimed is:

1. A vibro-isolating support comprising:
    an elastic support material interposed between a vibrating member and a supporting member;
    an elastically supported movable member;
    two chambers, including a main fluid chamber defined between said elastic support material and said movable member;
    an auxiliary fluid chamber of variable volume;
    an orifice interconnecting said chambers;
    fluid in said chambers and in said orifice; and,
    an actuator for displacing said movable member in the direction in which said main fluid chamber varies its volume, and
    characterized by a tubular member coupling said elastic support material and one of said vibrating and supporting members, said tubular member having an axis in the direction in which the vibrating member is supported, said tubular member having a neck formed at a position in the axial direction thereof, said main fluid chamber being located inside said tubular member, and said auxiliary fluid chamber and said orifice being located outside said tubular member, wherein:
    at least part of said tubular member has an outwardly opening, V-shaped, axial cross section.

2. A vibro-isolating support as claimed in claim 1, wherein:
    the axial cross section of at least part of said tubular member is cranked and opens outward.

3. A vibro-isolating support as claimed in claim 1, wherein:
    said elastic support material is bonded to an inner surface of said tubular member at a position which is nearer to the other of said vibrating and supporting members than is the position of said neck.

4. A vibro-isolating support as claimed in claim 1, wherein: said main fluid chamber has a circular cross section, coaxial with said tubular member, and smaller in diameter than said neck.

5. A vibro-isolating support as claimed in claim 1, wherein:
    said radially extending flat portion formed at a position which is nearer to one of said vibrating and supporting members than is the position of said neck, said movable member being supported on one of said vibrating and supporting members opposite to said flat portion.

6. A vibro-isolating support as claimed in claim 1, further comprising:
    an orifice-defining member which surrounds the outer surface of said tubular member, and a diaphragm which surrounds the outer surface of said orifice-defining member, said orifice being formed inside said orifice-defining member, said auxiliary fluid chamber being formed between said orifice-defining member and said diaphragm.

7. A vibro-isolating support as claimed in claim 6, wherein:
    said orifice-defining member is formed out of an elastic tube.

8. A vibro-isolating support as claimed in claim 6, wherein:
    said orifice-defining member is formed out of a metal tube.

9. A vibro-isolating support as claimed in claim 6, wherein:
    said orifice-defining member is formed by bending as an extension from the top portion of said tubular member.

10. A vibro-isolating support as claimed in claim 1, wherein:
    said movable member includes a pressure plate partially defining said main fluid chamber, and a flat spring joined to the center of the surface of said pressure plate which faces reversely to said main fluid chamber, the periphery of said flat spring being fixed to one of said vibrating body and supporting body sides.

11. A vibro-isolating support as claimed in claim 10, wherein:
    at least the surface of said pressure plate which faces said main fluid chamber is covered by an elastic film, the periphery of said elastic film being laid on said periphery of the flat spring and fixed to one of said vibrating body and supporting body sides.

12. A vibro-isolating support as claimed in claim 11, wherein:
    said pressure plate is wholly covered with an elastic film by curing adhesion.

13. A vibro-isolating support as claimed in claim 10, further comprising:
    an elastic stopper interposed between said flat spring and the periphery of the surface of said pressure plate which faces said flat spring.

14. A vibro-isolating support as claimed in claim 13, wherein:
    said stopper is an annular part fixed to said pressure plate.

15. A vibro-isolating support as claimed in claim 13, wherein:
    said stopper is an annular elastic film, the periphery of which is laid on said periphery of the flat spring and fixed to one of said vibrating body and supporting body sides.

16. A vibro-isolating support as claimed in claim 1, wherein:
    said actuator is an electromagnetic actuator for generating electromagnetic force, and
    said movable member comprises a magnetic path member, which can be magnetized, fitted on a portion of said movable member which faces said electromagnetic actuator.

17. A vibro-isolating support as claimed in claim 16, wherein:
    said electromagnetic actuator includes a yoke, which supports the end of said tubular member on one of said vibrating body and supporting body sides, said yoke being fixed to one of said vibrating body and supporting body sides.

18. A vibro-isolating support as claimed in claim 1, wherein:
    a fluid resonance system is formed by a mass corresponding to the fluid in said orifice and a spring corresponding to a spring in the expanding direction of said elastic support material and a spring supporting said movable member, the frequency for maximum damping in said liquid resonance system being substantially equal to the frequency of the vibration generated on said vibrating member.

19. A vibro-isolating support as claimed in claim 18, and applied to a vehicle, wherein:
    said vibrating body is an engine, said frequency for maximum damping in said fluid resonance system being substantially equal to the idle vibration frequency of said vehicle.

20. A vibro-isolating support as claimed in claim 1, further comprising:

an outer tube of metal surrounding said tubular member and extending between both ends of said tubular member, said tubular member and said outer tube defining a space therebetween, in which said auxiliary fluid chamber and said orifice are formed.

21. A vibro-isolating support as claimed in claim 1, wherein:

said part of said tubular member comprises first and second portions, said first and second portions are connected to each other at said neck, and each of said first and second portions extends radially outwardly from said neck.

22. A vibro-isolating support comprising:

an elastic support material interposed between a vibrating member and a supporting member;

an elastically supported movable member;

two chambers, including a main fluid chamber defined between said elastic support material and said movable member;

an auxiliary fluid chamber of variable volume;

an orifice interconnecting said chambers;

fluid in said chambers and said orifice; and, an actuator for displacing said movable member in the direction in which said main fluid chamber varies its volume, and characterized by a tubular member coupling said elastic support material and one of said vibrating and supporting members, said tubular member having an axis in the direction in which the vibrating member is supported, said tubular member having a neck formed at a position in the axial direction thereof, said main fluid chamber being located inside said tubular member, and said auxiliary fluid chamber and said orifice being located outside said tubular member;

wherein:

said tubular member has a radially extending flat portion, said main fluid chamber having an opening at the center of said flat portion, and the surface of said movable member which faces said main fluid chamber is a plane parallel to said flat portion, said plane being larger in area than the opening of said main fluid chamber.

* * * * *